United States Patent
Duffy et al.

(10) Patent No.: US 12,039,025 B2
(45) Date of Patent: Jul. 16, 2024

(54) BIOMETRIC AUTHENTICATION THROUGH VASCULAR MONITORING

(71) Applicant: JVCKENWOOD Corporation, Yokohama (JP)

(72) Inventors: David Michael Duffy, Zurich (CH); Jan Jasper van den Berg, London (GB); Christopher John Wright, London (GB)

(73) Assignee: JVCKENWOOD Corporation, Yokohama (JP)

(*) Notice: Subject to any disclaimer, the term of this patent is extended or adjusted under 35 U.S.C. 154(b) by 343 days.

(21) Appl. No.: 17/459,218

(22) Filed: Aug. 27, 2021

(65) Prior Publication Data

US 2022/0156353 A1    May 19, 2022

Related U.S. Application Data

(60) Provisional application No. 63/115,941, filed on Nov. 19, 2020.

(51) Int. Cl.
| | | |
|---|---|---|
| G06F 21/32 | (2013.01) | |
| G06F 3/01 | (2006.01) | |
| G06K 7/10 | (2006.01) | |
| G06Q 20/40 | (2012.01) | |
| G06V 40/10 | (2022.01) | |

(Continued)

(52) U.S. Cl.
CPC .............. G06F 21/32 (2013.01); G06F 3/017 (2013.01); G06K 7/10306 (2013.01); G06Q 20/40145 (2013.01); G06V 40/10 (2022.01); G06V 40/20 (2022.01); G06V 40/14 (2022.01); G06V 40/15 (2022.01)

(58) Field of Classification Search
CPC ..... G06F 21/32; G06F 3/017; G06K 7/10306; G06Q 20/40145; G06V 40/10; G06V 40/20; G06V 40/14; G06V 40/15
See application file for complete search history.

(56) References Cited

U.S. PATENT DOCUMENTS

| | | |
|---|---|---|
| 10,135,822 B2 | 11/2018 | Adams |
| 10,181,021 B2 | 1/2019 | Venkatraman et al. |

(Continued)

FOREIGN PATENT DOCUMENTS

| | | | |
|---|---|---|---|
| CN | 105992129 A | * 10/2016 | |
| CN | 110210394 A | * 9/2019 | ......... G06K 9/00885 |

(Continued)

OTHER PUBLICATIONS

"International Search Report and Written Opinion mailed on Feb. 28, 2022 for PCT Application No. PCT/JP2021/042417", 10 pages.

(Continued)

*Primary Examiner* — Trong H Nguyen
(74) *Attorney, Agent, or Firm* — Perkins Coie LLP; Han-Wei Chen; Andrew T. Pettit

(57) ABSTRACT

Introduced here are approaches to authenticating unknown persons based on variations in the properties of blood vessels over time. At a high level, these approaches rely on monitoring changes in a property of a blood vessel that occur over time. Examples of properties include the position, size, volume, and pressure of the blood vessel, as well as the velocity and acceleration of blood flowing through the blood vessel.

13 Claims, 17 Drawing Sheets

(51) Int. Cl.
*G06V 40/20* (2022.01)
*G06V 40/14* (2022.01)

(56) References Cited

U.S. PATENT DOCUMENTS

| | | |
|---|---|---|
| 10,547,611 B2 | 1/2020 | Adams |
| 10,721,228 B2 | 7/2020 | Adams |
| 10,880,303 B2 | 12/2020 | Adams et al. |
| 11,277,405 B2 | 3/2022 | Adams et al. |
| 11,368,455 B2 | 6/2022 | Adams |
| 11,374,929 B2 | 6/2022 | Adams et al. |
| 2006/0094937 A1* | 5/2006 | Immoreev ........ A61B 5/02438 600/301 |
| 2010/0074476 A1* | 3/2010 | Aoki ................ G06V 40/166 382/115 |
| 2014/0196131 A1* | 7/2014 | Lee .................... G06F 21/32 726/5 |
| 2015/0112159 A1 | 4/2015 | He et al. |
| 2015/0143496 A1* | 5/2015 | Thomas ............. G06F 21/40 726/7 |
| 2016/0117563 A1* | 4/2016 | Shin ................ G06V 40/10 382/115 |
| 2017/0124370 A1 | 5/2017 | He et al. |
| 2017/0161577 A1* | 6/2017 | Lee ................... A61B 5/0261 |
| 2017/0287325 A1 | 10/2017 | Filatova et al. |
| 2018/0052983 A1* | 2/2018 | Stolbikov ......... G06F 21/316 |
| 2019/0095681 A1* | 3/2019 | Lee ................... G06V 40/172 |
| 2019/0207932 A1 | 7/2019 | Bud et al. |
| 2019/0370527 A1* | 12/2019 | Lee ................... G06V 40/1312 |
| 2020/0077892 A1 | 3/2020 | Tran |
| 2020/0196879 A1* | 6/2020 | Ariyama ........... A61B 5/02116 |
| 2020/0272717 A1 | 8/2020 | Figueredo De Santana et al. |
| 2020/0327302 A1* | 10/2020 | He ..................... G06F 3/0421 |
| 2020/0358762 A1 | 11/2020 | Adams et al. |

FOREIGN PATENT DOCUMENTS

| | | | |
|---|---|---|---|
| KR | 20200041480 A | * | 4/2020 |
| WO | 2018175494 A1 | | 9/2018 |
| WO | WO-2021095903 A1 | * | 5/2021 |

OTHER PUBLICATIONS

Buddharaju, Pradeep, et al., "Physiology-Based Face Recognition in the Thermal Infrared Spectrum", IEEE Transactions on Pattern Analysis and Machine Intelligence, IEEE Computer Society, USA, vol. 29, No. 4, Apr. 2007, p. 613-626.

Jimenez, Jorge, et al., "A practical appearance model for dynamic facial color", ACM SIGGRAPH Asia 2010 Papers on, SIGGRAPH Asia '10, Jan. 2010, 8 pages.

Shang, Jiacheng, et al., "A Usable Authentication System Using Wrist-Worn Photoplethysmography Sensors on Smartwatches", 2019 IEEE Conference on Communications and Network Security (CNS), IEEE, Jun. 10, 2019, p. 1-9.

* cited by examiner

Hand placed near vascular scanner

Scan captured by vascular scanner

Vascular pattern used to identify unknown person through comparison to pre-registered patterns.

1100

1101

Receive first input indicative of a request to create a biometric signature for an individual to be used for authentication

1102

Cause presentation of an instruction to locate an electronic device near an anatomical region of the individual

1103

Cause the electronic device to emit a probing signal into the anatomical region

1104

Acquire data that is representative of the probing signal as reflected by a blood vessel located in the anatomical region

1105

Provide, as input, the data to an algorithm that produces a biometric signature for the individual as output

1106

Store the biometric signature in a profile associated with the individual

FIGURE 11

BIOMETRIC AUTHENTICATION THROUGH VASCULAR MONITORING

CROSS-REFERENCE TO RELATED APPLICATIONS

This application claims priority to U.S. Provisional Application No. 63/115,941, titled "Arterial Pocket Authentication" and filed on Nov. 19, 2020, which is incorporated by reference herein in its entirety.

TECHNICAL FIELD

The present disclosure pertains to biometric authentication in computer security and, more specifically, to techniques in which physiological characteristics are examined to allow for minimally disruptive authentication.

BACKGROUND

Biometric authentication procedures verify the identity of an individual through biometrics. The term "biometric" refers to a physical or behavioral characteristic that can be used as a means of verifying identity. Biometrics are difficult to spoof and convenient since the corresponding individuals do not have to remember passwords or manage tokens. Instead, the authentication mechanism is part of the individual.

Fingerprints have historically been the most common biometric modality. However, other biometric modalities have emerged as technologies have evolved. As an example, vascular pattern recognition (also referred to as "vein pattern authentication") uses near-infrared light to create images of subcutaneous blood vessels. These subcutaneous blood vessels collectively define a "vascular pattern" that can be used for authentication. Vein pattern authentication has shown promise as a vascular pattern will not only be unique to the corresponding individual but will also experience minimal change as that individual ages.

Vein pattern authentication normally involves identifying and then analyzing the vascular pattern along the backside of the hand. For instance, near-infrared light generated by light-emitting diodes (LEDs) may be emitted toward the backside of the hand so that it penetrates the skin. Due to the difference in absorbance of blood vessels and other tissues, the near-infrared light will be reflected towards the skin at different depths. The vascular pattern may be inferred based on an analysis of the reflected near-infrared light, and from the vascular pattern, features such as branching locations and angles can be determined (and then used for authentication).

Vein pattern authentication has been touted as a contactless option for biometric authentication that is relatively immune to forgery since vascular patterns are difficult to recreate. There are several downsides to vein pattern authentication, however. While individuals may not need to touch the sensing surface as they would in the case of fingerprint authentication, the backside of the hand must still be presented for analysis. This may be difficult in some situations (e.g., when the individual is not located proximate to the payment system) and simply burdensome in other situations (e.g., when the individual is wearing gloves).

BRIEF DESCRIPTION OF THE DRAWINGS

FIG. 11 depicts a flow diagram of a process for generating a biometric signature for an individual that can then be used for authentication.

Figure 1:
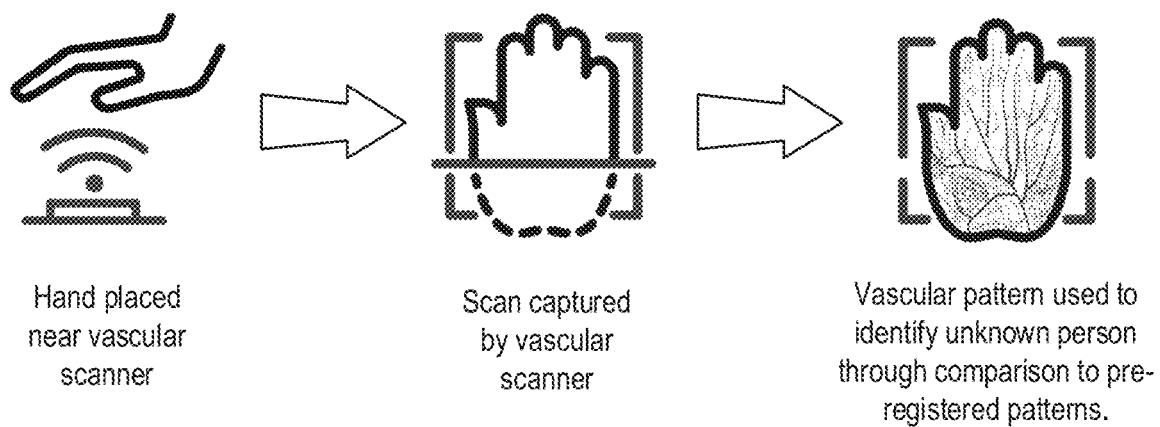
FIG. 1 includes a high-level illustration of a conventional authentication procedure in which an unknown person is prompted to present a hand to a vascular scanner.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

To enroll in an authentication program that relies on vein matching, an individual (also referred to as a "user") may initially be prompted to present a hand to a vascular scanner. The term "vascular scanner" may be used to refer to an imaging instrument that includes (i) an emitter operable to emit electromagnetic radiation (e.g., in the near infrared range) into the body and (ii) a sensor operable to sense electromagnetic radiation reflected by physiological structures inside the body. Normally, an image is created based on the reflected electromagnetic radiation that serves as a reference template. At a high level, the reference template is representative of a "ground truth" vascular pattern that can be used for authentication.

FIG. 1 includes a high-level illustration of a conventional authentication procedure in which an unknown person is prompted to present a hand to a vascular scanner. As shown in FIG. 1, the vascular scanner will emit electromagnetic radiation into the hand and then create an image (also referred to as a "scan") based on the electromagnetic radiation as reflected by the blood vessels in the hand. This image is indicative of the vascular pattern of the hand, and thus can be verified against a reference template created by a given individual during an enrollment phase (also referred to as a "registration phase"). If the image matches the reference template, then the unknown person will be authenticated as the given individual. However, if the image does not match the reference template, then the unknown person will not be authenticated as the given individual.

Vein matching has become an attractive option for biometric authentication since vascular scanners do not require contact with the body part being scanned. Vein matching has been shown to be susceptible to spoofing, however. As an example, Jan Krissler and Julian Albrecht demonstrated how vascular scanners could be bypassed using a fake hand made of wax at the Chaos Communication Congress in 2018. While spoofing is unlikely to be successful in most real-world conditions, any concerns related to vulnerabilities may impede adoption of a reliable technique of biometric authentication.

Introduced here, therefore, are approaches to authenticating unknown persons based on variations in the properties of blood vessels over time. At a high level, these approaches rely on monitoring vascular dynamics to recognize unknown persons. The term "vascular dynamics" refers to the changes in a property of a blood vessel that occur over time. Examples of properties include the position, size, volume, and pressure of the blood vessel, as well as the velocity and acceleration of blood flowing through the blood vessel.

To prevent spoofing, an authentication platform (also referred to as an "authentication system") may determine the degree to which the vascular dynamics of an unknown person whose identity is to be authenticated are similar to the vascular dynamics of a given individual. Assume, for example, that an unknown person wishes to authenticate herself as a given individual. In such a scenario, the unknown person may be prompted to locate a body part near a vascular scanner. Then, the vascular scanner may emit a series of signals into the body part and then generate data that is representative of the signals as reflected by physiological structures—including blood vessels—located in the body part. By analyzing the data, the authentication platform can determine, derive, or otherwise obtain a metric indicative of the vascular dynamics of the unknown person. This metric may be referred to as the "biometric signature" or "vascular signature" of the unknown person. The authentication platform can then compare the biometric signature against at least one registered biometric signature associated with the given individual in order to determine whether the unknown person should be authenticated as the given individual. Thus, the authentication platform can establish the likelihood that the unknown person is the given individual based on a comparison of their vascular dynamics.

Authentication based on vascular dynamics offers many of the same benefits as vein matching, namely, high accuracy, reliability, and consistency since the information being "read" is inside the body. However, vascular dynamics is less susceptible to spoofing since both the vascular pattern and changes in vascular properties can be used as unique biometrics.

For the purpose of illustration, embodiments may be described in the context of monitoring the vascular dynamics of the femoral artery. However, the approaches described herein may be similarly applicable to any artery, arteriole, capillary, venule, or vein. Similarly, the approaches described herein may be similarly applicable to any set of blood vessels. Accordingly, in situations where authentication is sought for a sensitive task, the authentication platform may monitor the vascular dynamics of more than one blood vessel.

While not required, implementations are described below in the context of instructions that are executable by an electronic device. The term "electronic device" is generally used interchangeably with the term "computing device," and thus may be used to refer to computer servers, POS systems, tablet computers, wearable devices (e.g., fitness trackers and watches), mobile phones, and the like.

While aspects of the technology, such as certain modules, may be described as being performed exclusively or primarily by a single electronic device, some implementations are practiced in distributed environments where modules are shared among multiple electronic devices that are linked through a network. For example, an unknown person may be asked to initiate an authentication procedure by a POS system, but the measuring of vascular dynamics may be performed by a mobile phone located proximate to the unknown person. Similarly, while the mobile phone may be responsible for measuring the vascular dynamics of the unknown person, the decision on whether to authenticate the unknown person may be made by an authentication platform that resides on a computer server to which the mobile phone is communicatively connected.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive sense (i.e., in the sense of "including but not limited to"). The term "based on" is also to be construed in an inclusive sense rather than an exclusive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, elements may be electrically or communicatively coupled to one another despite not sharing a physical connection.

The term "module" may refer broadly to software, firmware, and/or hardware. Modules are typically functional components that generate one or more outputs based on one or more inputs. A computer program may include or utilize one or more modules. Thus, a computer program may utilize multiple modules that are responsible for completing different tasks or a single module that is responsible for completing all tasks.

When used in reference to a list of multiple items, the term "or" is intended to cover all of the following interpretations: any of the items in the list, all of the items in the list, and any combination of items in the list. The term "and/or" is to be interpreted in a similar manner. Assume, for example, that an embodiment is described as including "a first item, a second item, and/or a third item." In such a situation, that phrase is intended to cover the first item individually, the second item individually, the third item individuals, the combination of the first and second items, the combination of the first and third items, and the combination of the second and third items.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Authentication Through Analysis of Vascular Information

Introduced here are authentication platforms that use vascular dynamics as biometric proof that an unknown person is a given individual. As further discussed below, the vascular dynamics of the unknown person can be measured using a probing signal that is emitted into the body. Reflections of the probing signal can be detected by a sensor that is positioned proximate to the body. These reflections may be representative of a "return signal" from which variations in vascular properties can be determined.

An authentication platform can be used to secure biometric-driven transactions such as payments authorized through hands-free interfaces. Assume, for example, that an unknown person wishes to authenticate herself in order to complete a transaction. Rather than prompt the unknown person to locate a body part (e.g., her hand) near a vascular scanner, biometric authentication could instead be performed using an electronic device that is already located proximate to her body. For instance, the electronic device may be located in a pocket of an article of clothing that is worn on the body. As an example, a mobile phone located in a pocket in pants worn by the unknown person may include an emitter operable to emit a probing signal and a sensor operable to sense the probing signal as reflected by physiological structures in the body. While this approach to authentication relies on analysis of blood vessels beneath the skin, the mobile phone does not need to contact the skin, nor does the mobile phone need to "see" the skin. As such, the authentication platform may permit persons to authenticate themselves in a minimally disruptive manner by relying on information regarding vascular dynamics.

Several different approaches to authentication are discussed in greater detail below. These approaches include:
Vascular Pattern Authentication: Authentication is based on the pattern of blood vessels as determined from the return signal;
Vascular Dynamics Authentication: Authentication is based on a measured characteristic of a blood vessel; and
Vascular Deformation Authentication: Authentication is based on a measured characteristic of a blood vessel as the unknown person interacts with the environment, for example, by performing a gesture that causes deformation of the blood vessel.

In some embodiments the authentication platform operates independently to authenticate the identity of unknown persons, while in other embodiments the authentication platform operates in conjunction with another system. For instance, a payment system may interface with an authentication platform to ensure that transactions are completed in a secure, hassle-free manner. As an example, the authentication platform may facilitate a non-contact payment procedure in which an unknown person is permitted to initiate or complete a transaction by making a body part available for scanning. As mentioned above, the unknown person may make the body part available for scanning by simply locating a vascular scanner near her body (e.g., in the pocket of pants worn by the unknown person).

Note that while embodiments may discuss authentication in the context of initiating or completing transactions, authentication can be useful in various context. Assume, for example, that a series of individuals have been invited to a network-accessible meeting in which sensitive information is to be shared. Each person who attempts to enter the network-accessible meeting may need to be authenticated by the authentication platform before access is permitted.

Overview of Authentication Platform

Figure 2A:
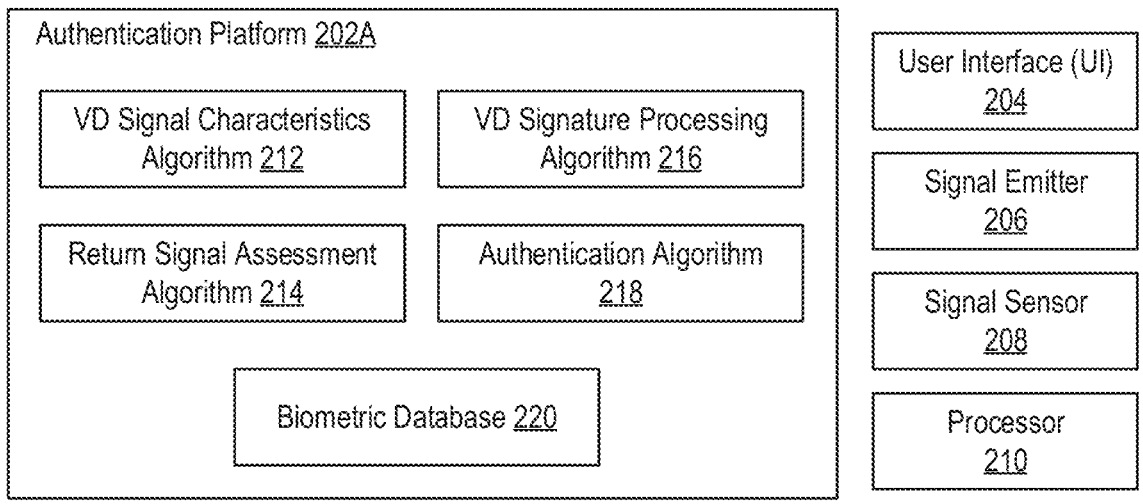
FIG. 2A includes a high-level representation of a system that can be used to authenticate the identity of an unknown person whose vasculature is available for scanning.

FIG. 2A includes a high-level representation of a system 200A that can be used to authenticate the identity of an unknown person whose vasculature is available for scanning. As shown in FIG. 2A, the system 200A includes an authentication platform 202A that has access to a user interface (UI) 204, signal emitter 206, signal sensor 208, and processor 210. As further discussed below, these elements of the system 200A can be embedded in the same electronic device or distributed amongst multiple electronic devices. For example, the authentication platform 202A may reside, partially or entirely, on a network-accessible server system while the UI 204, signal emitter 208, signal sensor 208, and processor 210 may reside on another electronic device located proximate to the unknown person.

The UI 204 is representative of the interface through which the unknown person is able to interact with the system 200. The UI 204 could be a speech-driven graphical user interface (GUI) shown on the display of an electronic device. Alternatively, the UI 204 could be a non-speech-driven GUI shown on the display of an electronic device. In such embodiments, the UI 204 may visually indicate a body part to be presented for authentication purposes. For example, the UI 204 may visually prompt the unknown person to present her hand to the signal emitter 206 and signal sensor 208 for scanning by presenting an illustration of the same.

The signal emitter 206 (also referred to as a "signal generator") may be configured to emit electromagnetic radiation into the body part presented by the unknown person in the form of pulses. Assume, for example, that the UI 204 indicates that the unknown person is to present her hand for authentication. In such a scenario, the signal emitter 206 can emit a signal into the hand over an interval of time. Normally, the interval of time is between 0.1 and 1.0 seconds, though it could be longer or shorter in some embodiments. The signal sensor 208, meanwhile, may be any sensing apparatus able to generate data that is representative of the signal as reflected by physiological structures located in the body. At a high level, the signal emitter 206 may be responsible for emitting a signal into the body over an interval of time, and the signal sensor 208 may be responsible for collecting reflections of the signal. For convenience, the signal emitted into the body may be referred to as the "probing signal" or "measurement signal," while the reflections of that signal may be referred to as the "return signal."

Those skilled in the art will recognize that reflections will occur at surfaces upon which the signal is incident. A reflecting surface is normally the boundary between two structures (e.g., blood vessel and tissue) having different electromagnetic properties. Ideally, the sensing apparatus should be able to detect the return signals with sufficient resolution to be able to distinguish between small differences (e.g., on the scale of micrometers) in order to detect changes in the properties of blood vessels as further discussed below. As an example, for large arterial vessels where the diameter of the walls is 0.5-1.0 millimeters, a resolution on the scale of tens of micrometers is normally sufficient to detect variations caused by changes in blood flow. Smaller vessels tend to require higher resolution, for example, on the scale of micrometers or less.

In some embodiments, the signal emitter 206 and signal sensor 208 are part of an active sensing system. The active sensing system may be, for example, an integrated circuit (IC) designed to emit and sense electromagnetic radiation within a predetermined frequency range (e.g., 6 to 8 gigahertz (GHz), 6 to 8.5 GHz, 6 to 9 GHz). ICs that are able to emit and sense electromagnetic radiation over a large frequency range (e.g., greater than 2 GHz) may be referred to as "ultra-wideband (UWB) ICs."

Notably, the signal emitter 206 and signal sensor 208 can operate together to capture information regarding vasculature (and, more specifically, properties of certain blood vessels) at a distance through obstructions. Accordingly, the unknown person to be authenticated may not need to actually contact the signal emitter 206 or the signal sensor 208 as further discussed below.

As noted above, the signal emitter 206 and signal sensor 208 may be embedded in a single electronic device. In some embodiments, the electronic device is associated with the unknown person. For example, the signal emitter 206 and signal sensor 208 may be embedded in a mobile phone that is associated with the unknown person. In other embodiments, the electronic device is not associated with the unknown person. For example, the signal emitter 206 and signal sensor 208 may be embedded in a POS system through which the unknown person is attempting to complete a transaction.

As shown in FIG. 2A, the authentication platform 202A may include a vascular dynamics (VD) signal characteristics algorithm 212, a return signal assessment algorithm 214, a VD signature processing algorithm 216, an authentication algorithm 218, and a biometric database 220. The biometric database 220 may store biometric data that is representative of gathered information related to vascular properties that can be used to identify known persons. As further discussed below, the biometric data in the biometric database 220 may vary depending on the approach to authentication employed by the system 200A. The biometric data in the biometric database 220 may be encrypted, hashed, or otherwise obfuscated to prevent unauthorized access.

For example, the biometric database 220 may include reference values for different vascular properties in embodiments where the authentication platform 200A determines whether authentication is appropriate based on vascular dynamics. Thus, the biometric database 220 may include data indicating the temporal variation in a vascular property for a given blood vessel. As further discussed below, this data may be used for authentication as the temporal variation can not only be uniquely associated with an individual but may also vary across different blood vessels of that individual.

As another example, the biometric database 220 may include models that indicate deformation of a given blood vessel when a gesture is performed by a given individual or different individuals. Each model may be representative of a series of discrete positions indicating how the shape of the given blood vessel changed over time as the gesture was performed. These models may be stored in profiles associated with different individuals. A profile could include a single model associated with a single gesture, multiple models associated with a single gesture, or multiple models associated with different gestures.

Accordingly, the biometric database 220 may include one or more biometric signatures. Each biometric signature may be representative of one or more values that indicate the temporal variation in a vascular property of a given blood vessel of a given individual. As an example, a biometric signature may comprise a vector of length N, where each element is an intensity value based on the size of the frequency shift between the probing signal and corresponding return signal, thereby indicating amplitude of vibration of the blood vessel wall. N may represent the number of samples taken over time. Said another way, N may represent the number of probing signals that are emitted into the body over the course of an authentication procedure.

The biometric signatures in the biometric database 220 may be associated with a single individual, in which case the authentication platform 202A may be limited to authenticating an unknown person as that individual. Alternatively, these biometric signatures may be associated with multiple individuals, in which case the authentication platform 202A may be able to authenticate an unknown person as any of those individuals. Thus, a single individual may have multiple biometric signatures in the biometric database 220. These biometric signatures may correspond to different blood vessels and/or different electronic devices used for acquisition. For example, a single electronic device (e.g., a mobile phone) may be located proximate to multiple anatomic regions (e.g., in different pockets), and there may be a different biometric signature for each anatomic region. As another example, an individual may be associated with multiple electronic devices (e.g., a mobile phone and wearable device), and there may be a different biometric signature for each electronic device.

In some embodiments, each biometric signature is assigned a quality rating that indicates how reliable that biometric signature is likely to be for authentication. The quality rating may be based on factors such as signal-to-noise ratio (SNR) of the original return signals, repeatability of the original measurement, and the like. In embodiments where multiple biometric signatures are used for authentication, the corresponding quality ratings may be used to establish proper weights for those biometric signatures. At a high level, more weight may be assigned to those biometric signatures having higher quality ratings.

When executed by the processor 210, the algorithms implemented in the authentication platform 202A allow an individual to generate a biometric signature during a registration phase. Thereafter, the algorithms implemented in the authentication platform 202A allow verification to occur during a usage phase. The registration and usage phases are further described below with reference to FIGS. 4A-7B.

The VD signal characteristics algorithm 212 may be responsible for defining the properties of the probing signal to be emitted into the body of the unknown person to be authenticated. For example, the VD signal characteristics algorithm 212 may define characteristics such as the frequency of the probing signal (e.g., to control for penetration depth), amplitude (e.g., to return a stronger signal at the risk of higher noise), samples per second, emission timing, emission duration, or any combination thereof. The VD signal characteristics algorithm 212 may obtain, as input, any of the following:

- Properties of the electronic device, such as known position or power availability;
- Properties of the signal emitter 206, such as power requirements, maximum emission magnitude, or maximum emission frequency;
- Properties of the signal sensor 208, such as power requirements, sensitivity, or frequency range; or
- Outputs produced by the return signal assessment algorithm 214 indicating, for example, issues with data acquisition.

The return signal assessment algorithm 214 may be responsible for assessing the return signals by examining the data that is generated by the signal sensor 208. For example, the return signal assessment algorithm 214 may assess each return signal in order to produce and then assign a quality rating. If one or more return signals are deemed unacceptable (e.g., based on the corresponding quality ratings), the return signal assessment algorithm 214 may prompt the VD signal characteristics algorithm 212 to alter one or more characteristics of the probing signal. For example, the return signal assessment algorithm 214 may trigger the VD signal characteristics algorithm 212 to alter the probing signal responsive to discovering that a certain number or percentage of return signals are unacceptable. Then, the data acquisition process can begin again. Thus, the return signal assessment algorithm 214 may initiate a feedback loop for optimizing the characteristics of the probing signal.

The VD signature processing algorithm 216 may be responsible for examining the data generated by the signal sensor 208 to generate a biometric signature that can be used for authentication. As further discussed below, biometric signatures can be created during (i) a registration phase in which an individual enrolls in an authentication program supported by the authentication platform 202A and (ii) a usage phase in which an unknown person is authenticated by the authentication platform 202A. At a high level, the biometric signature may be indicative of a metric related to vascular dynamics. One example of a biometric signature is a series of values indicating the change in the position, size, volume, or pressure of the blood vessel over time. Another example of a biometric signature is a series of values indicating the change in the velocity or acceleration of blood flowing through the blood vessel over time. While the term "biometric signature" may be used to refer to multiple values corresponding to different points in time, a single value could also be used as a biometric signature. For example, the depth of a given blood vessel with respect to the surface of the skin may be used as a biometric signature.

During the usage phase, the authentication algorithm 218 may be called to perform authentication by comparing a new biometric signature generated for an unknown person with one or more reference biometric signatures associated with a given individual. As mentioned above, the reference biometric signatures may be stored in the biometric database 220. The output produced by the authentication algorithm 218 may represent the final decision as to whether the unknown person should be authenticated as the given individual. The authentication algorithm 218 may output discrete outputs or continuation outputs, such as a probability metric (e.g., specifying likelihood of the unknown person being the given individual), a binary output (e.g., authenticated or not authenticated), a classification (e.g., specifying whether the unknown person was authenticated with a low, moderate, or high degree of confidence), etc.

Figure 2B:
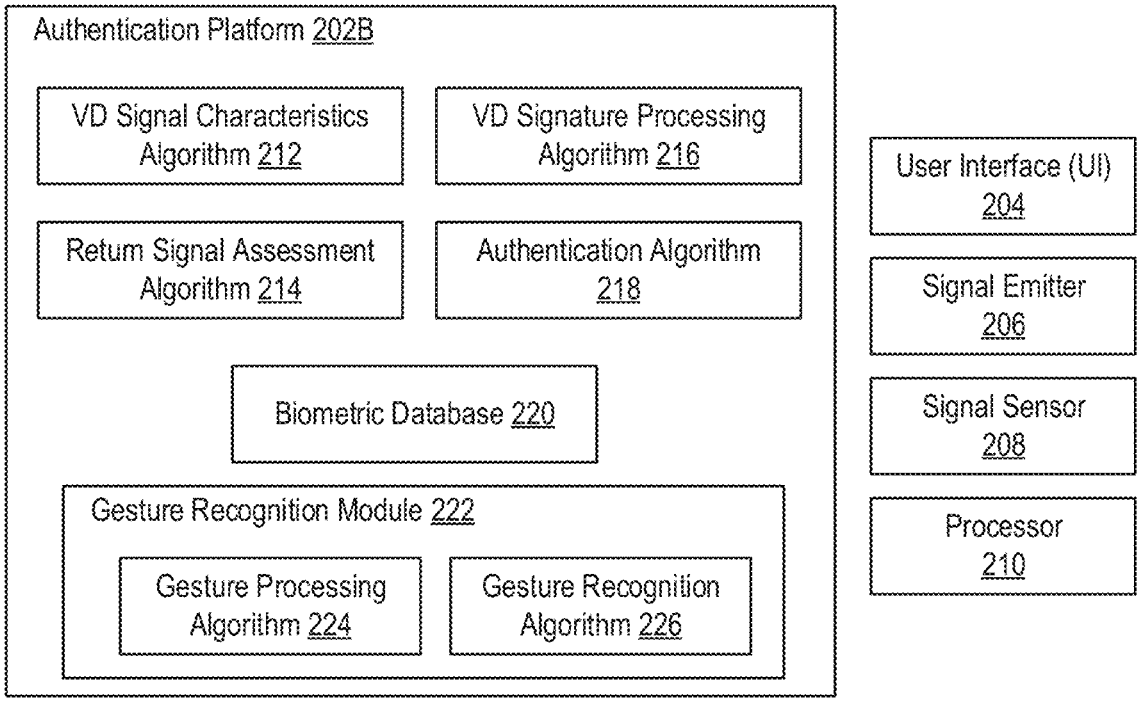
FIG. 2B includes a high-level representation of a system that can be used to authenticate the identity of an unknown person based on gesture recognition.

FIG. 2B includes a high-level representation of a system 200B that can be used to authenticate the identity of an unknown person based on gesture recognition. At a high level, the system 200B of FIG. 2B operates in a similar manner as the system 200A of FIG. 2A. Here, however, the authentication platform 200B determines whether to authenticate the unknown person based on an analysis of data generated by the signal sensor 208 as the unknown person performs a physical action (referred to as a "gesture"). Alternatively, the data may be based on, or representative of, an output produced by the signal sensor 208 as the unknown person performs the gesture.

Accordingly, the biometric database 220 may include data related to the performance of a given gesture, as well as other data related to vascular properties. For example, the biometric database 220 may include a "gesture signature" that is representative of data pertaining to the performance of a gesture by a given individual. The data may include one or more values of a vascular property over the course of the performance. The gesture signature may be associated with an anatomical location (and thus one or more blood vessels) and/or an electronic device. As an example, the data may specify changes in the size of the radial artery, as determined by a wrist-mounted electronic device, as a given individual bends her wrist downward and then upward. In such a scenario, the gesture signature is associated with a particular gesture (i.e., the downward and then upward bending of the wrist), a particular blood vessel (i.e., the radial artery), and a particular electronic device (i.e., the wrist-mounted electronic device).

The gesture may be any movement that requires clenching or activating one or more muscles and will result in a variation in blood supply to those muscle(s). This variation in blood supply will affect the vascular dynamics of blood vessels in the same anatomical region. Each gesture signature may comprise a vector of length N, where each element is an intensity value based on the size of the frequency shift between the probing signal and corresponding return signal. Frequency shifts may correlate to expansions or contractions of the corresponding blood vessel, which in turn will correlate to activation of certain muscle(s) during the performance of a gesture.

As shown in FIG. 2B, the authentication platform 202B may include a gesture recognition module 222 that is operable to facilitate authentication based on vascular dynamics while gestures are performed. The gesture recognition module 222 can include a gesture processing algorithm 224 and a gesture recognition algorithm 226. At a high level, these algorithms may be able to determine whether data generated by the signal sensor 208 while an unknown person performs a gesture is sufficiently similar to data generated by the signal sensor 208 (or another signal sensor) during one or more prior performances. Such an approach allows the gesture recognition module 222 to establish whether the unknown person performed the gesture as requested, and thus whether the unknown person should be authenticated as the given individual.

The gesture processing algorithm 224 may be responsible for examining the data generated by the signal sensor 208 to generate a gesture signature that can be used for authentication. For example, the gesture processing algorithm 224 may parse the data to identify a series of values that correspond to performance of a gesture and then define, based on the series of values, the gesture signature. As further discussed below, the gesture processing algorithm 224 may be tasked with generating gesture signatures during the registration and usage phases.

Conversely, the gesture recognition algorithm 226 may only be executed during the usage phase. During the usage phase, the gesture recognition algorithm 226 may be responsible for identifying a gesture that is being performed based on an analysis of the data generated by the signal sensor 208. For example, the gesture recognition algorithm 226 may identify the gesture by comparing a new gesture signature generated for an unknown person with one or more reference gesture signatures stored in the biometric database 220. The gesture recognition algorithm 226 can then produce an output that specifies whether the unknown person performed the gesture, for example, as request through the UI 202. In some embodiments, the authentication platform 202B determines whether to authenticate the unknown person as the given individual based solely on whether the output indicates that the gesture was performed by the unknown person. In other embodiments, the authentication platform 202B takes a more nuanced approach. For example, the authentication platform 202B may attempt to determine the degree of similarity between the performance of the gesture by the unknown person and past performance(s) of the gesture by the given individual.

Figure 2C:
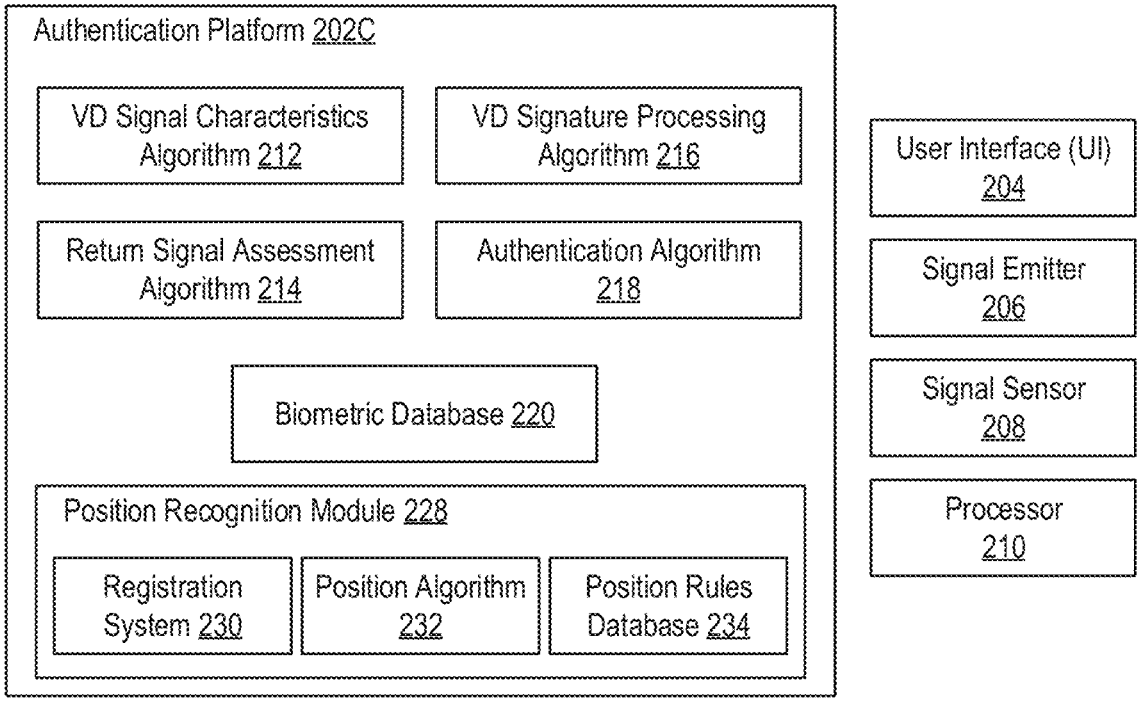
FIG. 2C includes a high-level representation of a system that can be used to authenticate the identity of an unknown person based on positional recognition.

FIG. 2C includes a high-level representation of a system 200C that can be used to authenticate the identity of an unknown person based on positional recognition. At a high level, the system 200C of FIG. 2C operates in a similar manner as the system 200A of FIG. 2A. Here, however, the authentication platform 200C determines whether to authenticate the unknown person based on whether the signal scanner 208 is in an expected position with respect to the body of the unknown person.

In this embodiment, at least some of the biometric signatures in the biometric database 220 may be associated with a value that indicates position. These values may be referred to as "position tags" or "position labels." A position label may include an alphanumeric identifier or a description of the position. Examples of suitable descriptions include "front right pants pocket," "back left pants pocket," "left breast," and "right wrist." Thus, each position label may indicate the anatomical region near which the signal sensor 208 was located when the corresponding biometric signature was generated.

As shown in FIG. 2C, the authentication platform 202C may include a position recognition module 228 that is operable to facilitate authentication based on whether vascular dynamics indicate the signal sensor 208 is in an expected position. The position recognition module 228 can include a registration system 230, a position algorithm 232, and a position rules database 234.

The position rules database 234 may contain rules associated with each position label that is available. These rules may be defined by a user of the authentication platform 200C, an administrator responsible for managing the authentication platform 200C, or the authentication platform 200C itself. As an example, a rule may specify purchase permissions, purchase conditions (e.g., maximum value of purchase), or authentication conditions. Accordingly, the position recognition module 228 (and thus the authentication platform 200C) may prevent, restrict, or otherwise limit authentication based on the rules in the position rules database 234. Rules may also be general instructions related to a particular computer program. As an example, a rule may define the criteria that must be met to play a song through a computer program focused on music, or a rule may define the criteria that must be met to initiate a step count for a computer program focused on fitness. Rules may be configurable (e.g., creatable or editable) through the UI 202.

The registration system 230 may allow a person (e.g., a user or administrator) to assign rules to particular position labels, as well as update these rules once stored in the position rules database 234. As an example, a user may wish to specify that unless a given electronic device (e.g., a mobile phone) is in a given location (e.g., a front left pants pocket), transactions requiring authentication should be limited to a certain dollar amount (e.g., no more than $50). As discussed above, the authentication platform 200C may be able to infer whether the given electronic device is in the given location by examining data generated by the signal sensor 208 during a usage phase. More specifically, the authentication platform 200C may analyze the data to determine whether its values are indicative of a blood vessel (e.g., the femoral artery) that is known to be proximate to the given location.

Meanwhile, the position algorithm 232 may be responsible for retrieving position labels associated with biometric signatures from the biometric database 214 as necessary. Moreover, the position algorithm 232 may use those position labels to retrieve appropriate rules from the position rules database 234.

Figure 3:
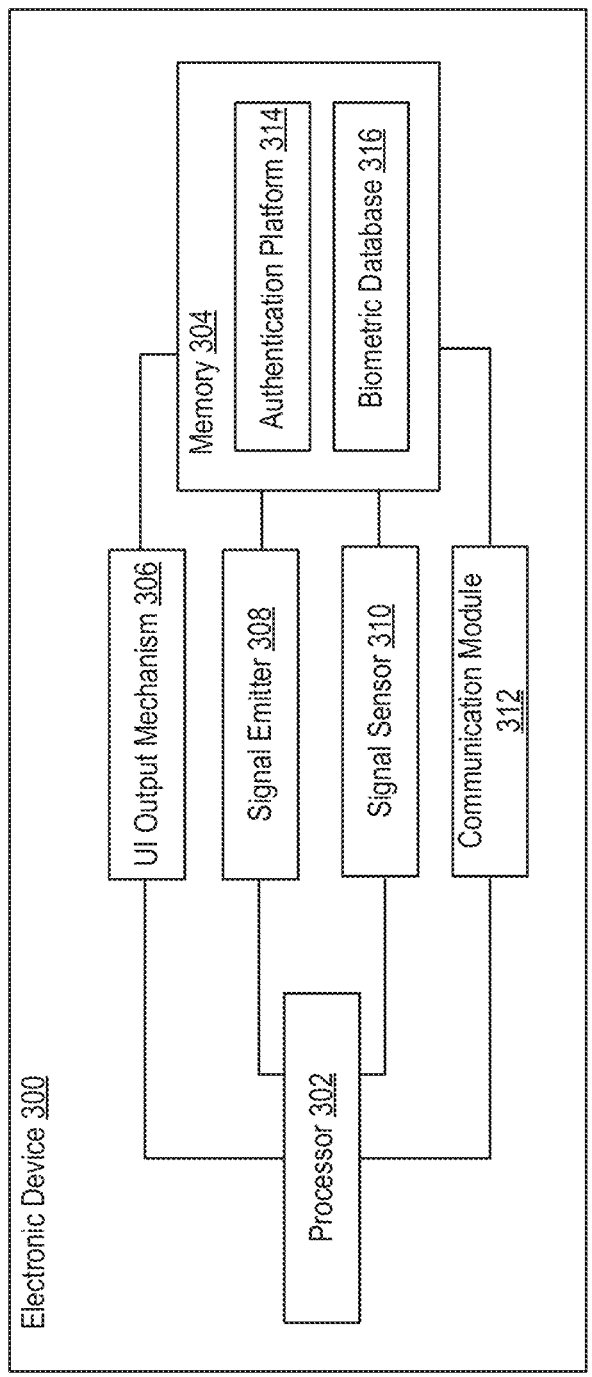
FIG. 3 illustrates an example of an electronic device able to implement an authentication platform that is designed to authenticate the identity of an unknown person based on data generated by a signal sensor.

FIG. 3 illustrates an example of an electronic device 300 able to implement an authentication platform 314 that is designed to authenticate the identity of an unknown person based on data generated by a signal sensor 310. As discussed above, a signal emitter 308 can emit a probing signal into the body of the unknown person, while the signal sensor 310 can generate the data based on reflections of the probing signal by physiological structures in the body. In some embodiments, the probing signal is representative of radio waves, so the return signals detected by the signal sensor 310 may also be radio waves. Note that the signal emitter 308 could also be configured to emit a discrete series of probing signals referred to as "pulses" over an interval of time.

In some embodiments, the authentication platform 314 is embodied as a computer program that is executed by the electronic device 300. For example, the authentication platform 314 may reside on a mobile phone that is able to obtain the data from which a determination can be made whether authentication is appropriate. As another example, the authentication platform 314 may reside on a wearable device that is able to obtain the data from which the determination can be made. Examples of wearable devices include watches, fitness trackers, and head-mounted displays. In other embodiments, the authentication platform 314 is embodied as a computer program that is executed by another electronic device to which the electronic device 300 is communicatively connected. In such embodiments, the electronic device 314 may transmit the data to the other electronic device for processing. For example, while authentication of an unknown person may be sought by a POS system used to initiate a transaction, the data may be generated by a mobile phone located proximate to the unknown person. The data could be provided to the POS system or another electronic device (e.g., a computer server) for processing, or the data could be processed by the mobile phone prior to delivery to the POS system or other electronic device. Those skilled in the art will recognize that aspects of the authentication platform 314 could also be distributed amongst multiple electronic devices.

The electronic device 300 can include a processor 302, memory 304, user interface (UI) output mechanism 306, signal emitter 308, signal sensor 310, and communication module 312. The communication module 312 may be, for example, wireless communication circuitry designed to establish communication channels with other electronic devices. Examples of wireless communication circuitry include integrated circuits (also referred to as "chips") configured for Bluetooth, Wi-Fi, NFC, and the like. The processor 302 can have generic characteristics similar to general-purpose processors, or the processor 302 may be an application-specific integrated circuit (ASIC) that provides control functions to the electronic device 300. As shown in FIG. 3, the processor 302 can be coupled to all components of the electronic device 300, either directly or indirectly, for communication purposes.

The memory 304 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 302, the memory 304 can also store data generated by the signal sensor 310 and data generated by the processor 302 (e.g., when executing the modules of the authentication platform 314). Note that the memory 304 is merely an abstract representation of a storage environment. The memory 304 could be comprised of actual memory chips or modules.

As discussed above, the signal emitter 308 may be configured to emit electromagnetic radiation into the body of an unknown person to be authenticated, for example, in the form of radio waves. Normally, the signal emitter 308 emits electromagnetic radiation only when instructed to do so. For example, the authentication platform 314 may be configured to determine whether authentication is necessary. In such a scenario, the authentication platform 314 may generate an output that prompts the processor 302 to instruct the signal emitter 308 to emit a probing signal with certain characteristics. As discussed above, those characteristics may be determined by the authentication platform 314.

The signal sensor 310 may be any sensing apparatus able to collect reflections of the probing signal as reflected by physiological structures in the body. The data from which vascular dynamics can be determined may be based on, or representative of, these reflections.

The communication module 312 can manage communications between the components of the electronic device 300. The communication module 312 can also manage communications with other electronic devices. Examples of electronic devices include mobile phones, tablet computers, personal computers, wearable devices, POS systems, and network-accessible server systems comprised of one or more computer servers. For example, in embodiments where the electronic device 300 is a mobile phone, the communication module 312 may be communicatively connected to a network-accessible server system that is responsible for examining data generated by the signal sensor 310.

For convenience, the authentication platform 314 may be referred to as a computer program that resides in the memory 304. However, the authentication platform 314 could be comprised of software, firmware, or hardware components implemented in, or accessible to, the electronic device 300. In accordance with embodiments described herein, the authentication platform 314 may include various algorithms and modules (collectively referred to as "elements") as discussed above with reference to FIGS. 2A-C. These elements can be an integral part of the authentication platform 314. Alternatively, these elements can be logically separate from the authentication platform 314 but operate "alongside" it. Together, these elements may enable the authentication platform 314 to authenticate the identity of an unknown person based on an analysis of vascular dynamics as determined from data generated by the signal sensor 310. As an example, upon obtaining data generated by the signal sensor 310, the authentication platform 314 may generate a biometric signature for the unknown individual into whom the signal emitter 308 emitted the pulse signal. Then, the authentication platform 314 can compare the biometric signature against at least one reference biometric signature associated with a given individual that is stored in the biometric database 316. The authentication platform 314 may determine whether to authenticate the unknown person as the given individual based on the degree of similarity between the biometric signature and reference biometric signatures. In FIG. 3, the biometric database 318 is located in the memory 304 of the electronic device 300. However, the biometric database 318 could alternatively or additionally be located in a remote memory accessible to the electronic device 300 via a network.

Other elements could also be included as part of the authentication platform 314. For example, a UI module may be responsible for generating the content to be output by the UI output mechanism 306 for presentation to the unknown person. The form of the content may depend on the nature of the UI output mechanism 306. For example, if the UI output mechanism 306 is a speaker, then the content may include an audible instruction to either locate the electronic device 300 near an anatomical region or indicate that the authenticate phase should proceed. As another example, if the UI output mechanism 306 is a display, then the content may include a visual instruction to either locate the electronic device 300 near an anatomical region or indicate that the authenticate phase should proceed.

Methodologies for Authentication

Figure 4A:
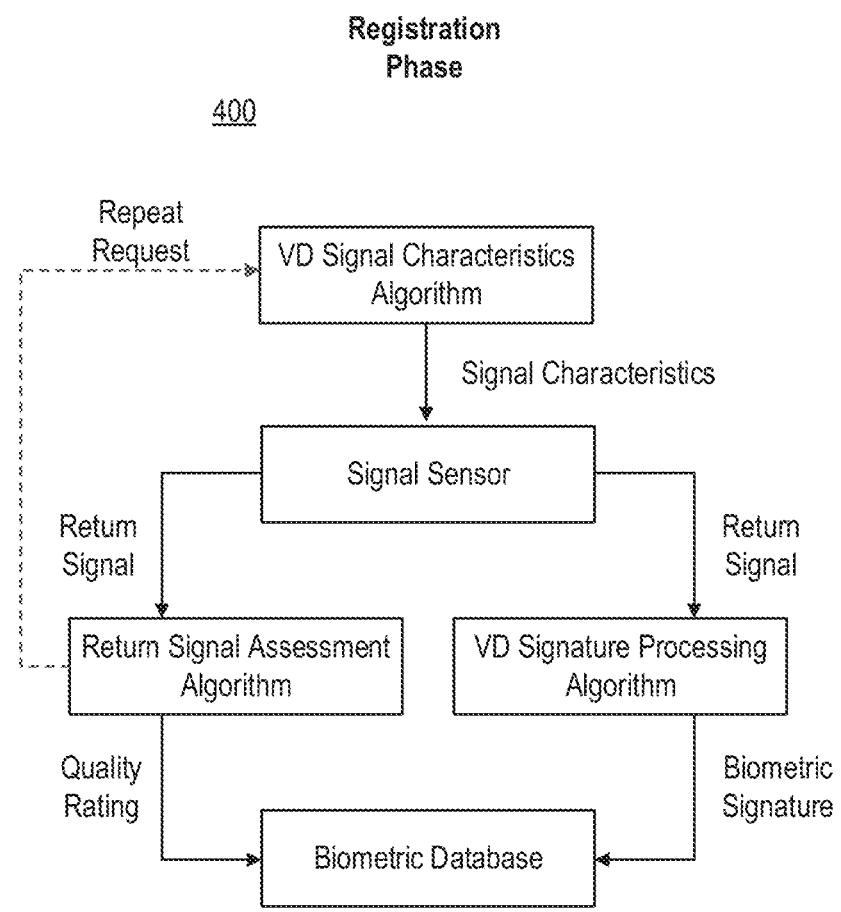
FIGS. 4A-B include flow diagrams of a procedure for authenticating a user of an authentication platform based on radar detection of vascular dynamics as monitored using an electronic device located proximate to the body.
Figure 4B:
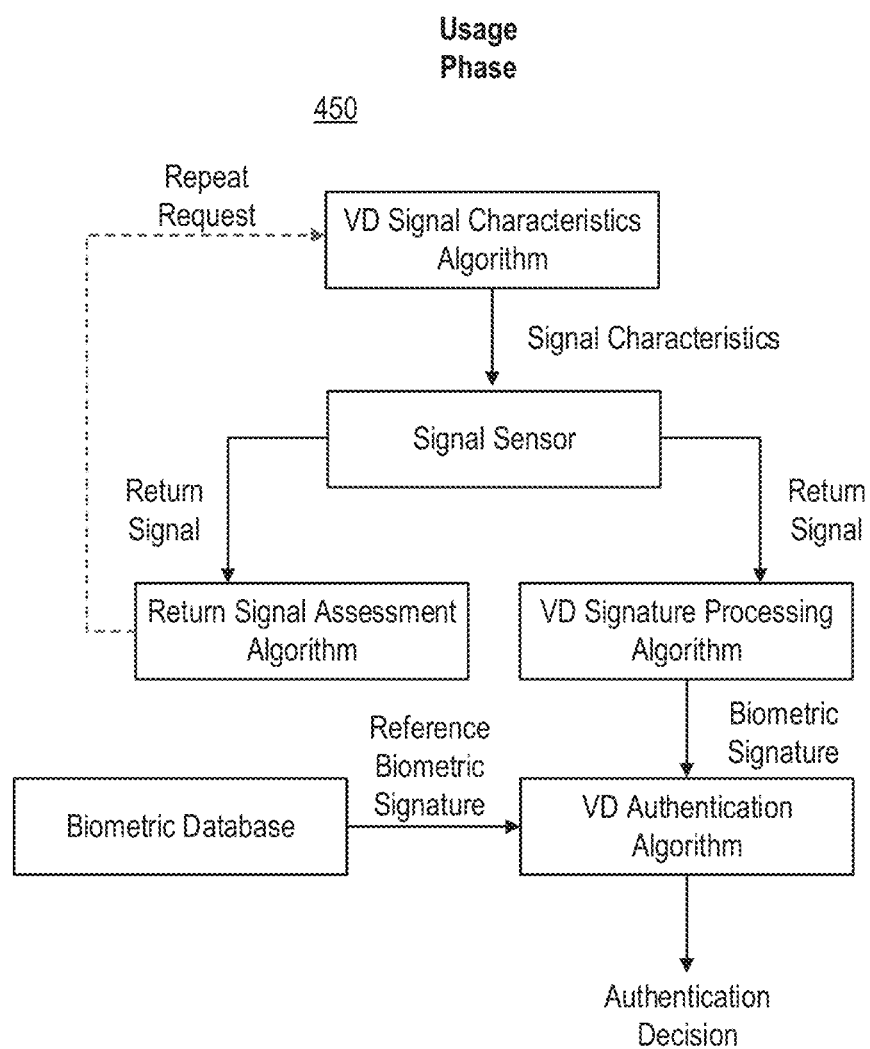
Figure 5A:
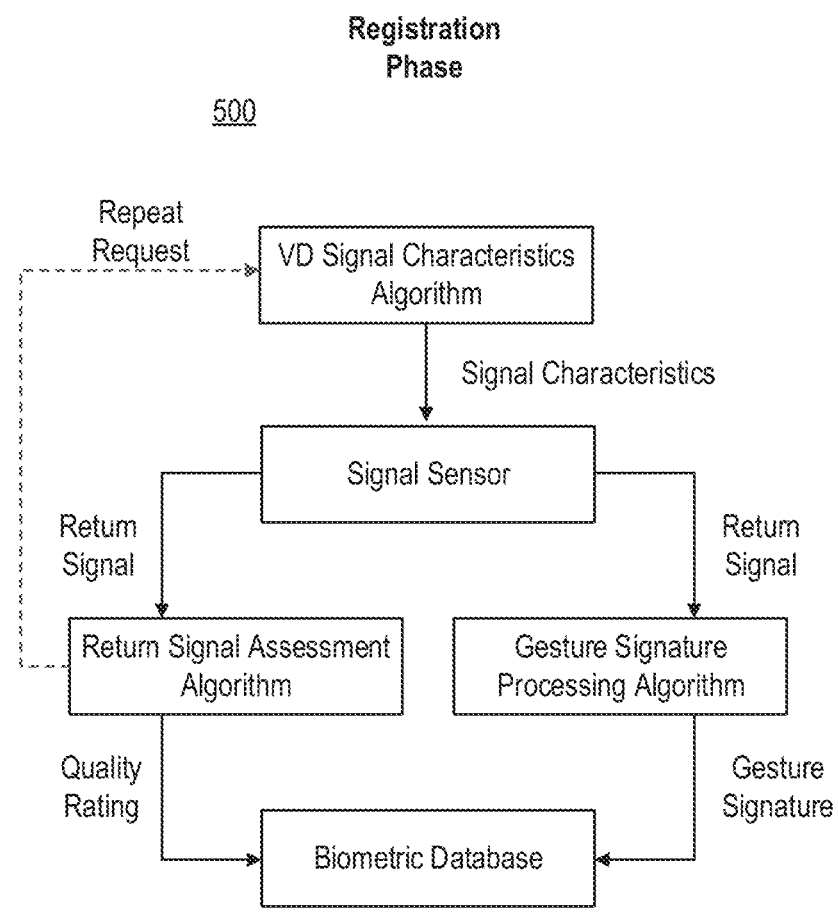
FIGS. 5A-B include flow diagrams of a registration phase and usage phase in embodiments where the authentication platform determines whether to authenticate a user based on gesture recognition.
Figure 5B:
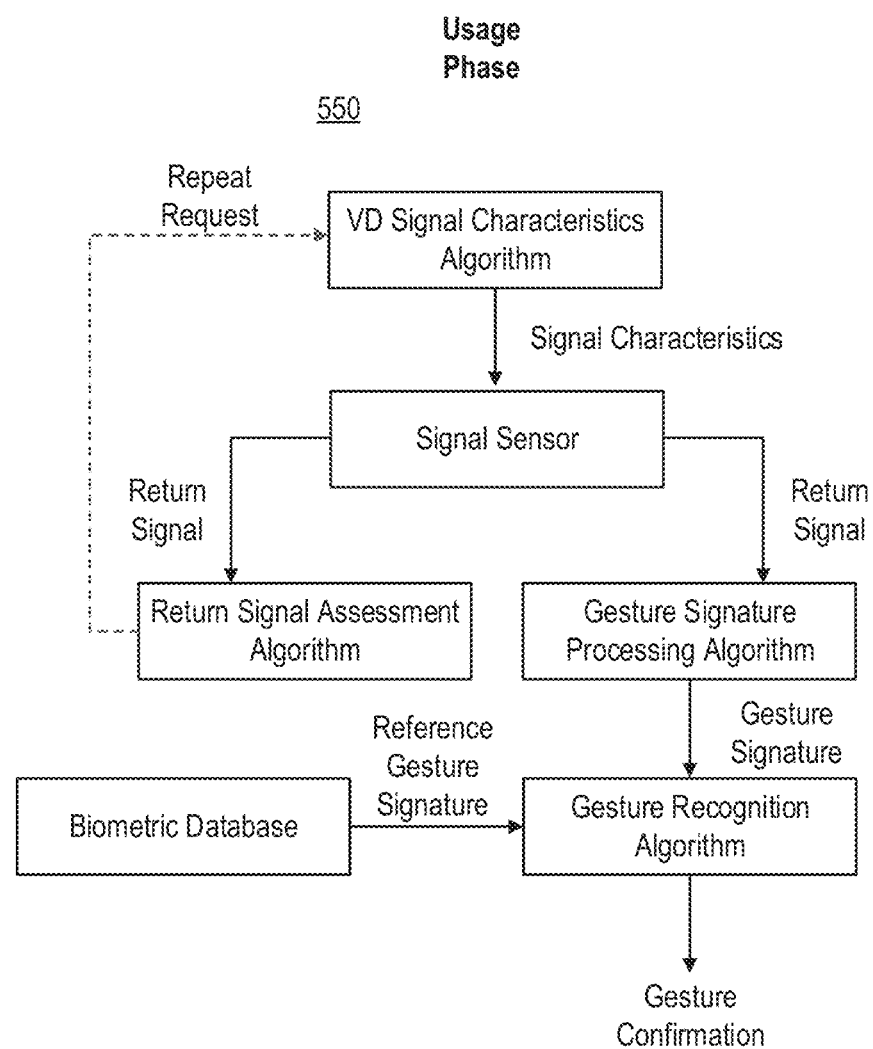

FIGS. 4A-B include flow diagrams of a procedure for authenticating a user of an authentication platform based on radar detection of vascular dynamics as monitored using an electronic device located proximate to the body. FIGS. 5A-B include flow diagrams of these processes in the context of gesture recognition, while FIGS. 6A-B include flow diagrams of these processes in the context of position recognition. Note that unless otherwise specified, the steps of these processes could be combined with the steps of other processes. Thus, an authentication platform could utilize aspects of vascular dynamics recognition, gesture recognition, or position recognition when tasked with authenticating an unknown person.

As shown in FIGS. 4A-B, the authentication procedure has two phases, a registration phase 400 and a usage phase 450. These phases may be designed to allow for hands-free authentication without requiring that the user interact with any electronic devices.

To begin the registration phase 400, the user may locate an electronic device that includes (i) a signal emitter and (ii) a signal sensor in an initial position. Note that in some situations, the user may need to place the electronic device in the initial position. For example, the user may need to hold the electronic device in the initial position. In other situations, the user may simply need to allow the electronic device to remain in its current position. For example, the user may be instructed to place the electronic device in a pants pocket in which the electronic device is already located.

The user may be prompted to locate the electronic device in the initial position by the electronic device or another electronic device. For example, the user may indicate, through an interface presented on the display of the electronic device, that she is interested in registering for an authentication platform. Generally, the initial position is located proximate to an anatomical region (and thus, a blood vessel) of interest. For example, the authentication platform may request that the user locate the electronic device in a front pants pocket to be proximate to the femoral artery, or the authentication platform may request that the user locate the electronic device near the wrist to be proximate to the radial artery.

In some embodiments, the user may authenticate herself before the registration phase 400 proceeds. For example, the user may be prompted to provide sensitive information (e.g., a name, address, or payment card number) that could serve as a means to prove identity.

Then, the VD signal characteristics algorithm of the authentication platform can generate an initial set of signal characteristics. In some embodiments the initial set of signal characteristics are representative of default signal characteristics, while in other embodiments the initial set of signal characteristics are representative of the default signal characteristics as modified based on conditions of the registration phase 400. For example, the VD signal characteristics algorithm may modify the default frequency range used for scanning based on the initial position (and thus, the penetration depth that will likely be required). As another example, the VD signal characteristics algorithm may modify the default peak amplitude based on the minimum power requirements of the signal sensor included in the electronic device.

This initial set of signal characteristics can be provided to the signal emitted included in the electronic device so that a probing signal can be emitted in accordance with the initial set of signal characteristics. Thus, the signal emitter may emit the probing signal at an intensity, duration, timing condition, and frequency range defined by the VD signal characteristics algorithm. As shown in FIG. 4A, the signal sensor will then detect the return signal generated through reflections of the probing signal within the body. The return signal can be provided, as input, to the return signal assessment algorithm or VD signature processing algorithm.

The return signal assessment algorithm may be responsible for assessing the quality of the return signal. For example, the return signal assessment algorithm may compare one or more properties of the return signal to predefined benchmarks to assess quality. Such properties may include the amplitude, SNR, and repeatability. For each benchmark, the return signal assessment algorithm may assign a value (e.g., between 0 and 1, between 1 and 100, etc.) based on the difference between the corresponding property and benchmark. These values can then be summed and divided by the total number of properties in order to establish a quality rating for the return signal as a whole. In some embodiments, the properties may be assigned weights. In such embodiments, some properties may affect the quality rating more than other properties. If any values are below a threshold defining the minimum standard for acceptability, the return signal assessment algorithm, may output a report indicating each property that does not meet the corresponding benchmark. This report may be used by the VD signal characteristics algorithm to update the signal characteristics for the probing signal and then initiate another scan.

After an acceptable return signal has been obtained, the VD signature processing algorithm can process the return signal to generate a biometric signature. For example, the VD signature processing algorithm may take the difference in frequency (referred to as the "frequency shift") between the probing signal and return signal for each of N time-stamped samples taken across an interval of time (also referred to as the "measurement interval" or "scanning interval"). The frequency shifts can then be normalized and stored in a vector of length N. In some embodiments, the vector further includes information such as the temporal "steps" between each frequency shift. The vector may be representative of the biometric signature generated for the return signal.

As shown in FIG. 4A, the quality rating produced by the return signal assessment algorithm and the biometric signature produced by the VD signature processing algorithm can be stored in a biometric database accessible to the authentication platform. For example, the quality rating and biometric signature may be populated into an entry of a data structure that is representative of the biometric database. In some embodiments the biometric database is maintained on the same electronic device as the authentication platform, while in other embodiments the biometric database is maintained on a different electronic device than the authentication platform. For example, the authentication platform may reside on the electronic device that is located proximate to the body of the user, while the biometric database may reside on a network-accessible server system to which the electronic device is communicatively connected.

This process may be completed multiple times during the registration phase 400. For example, the user may locate the electronic device in different positions to generate multiple biometric signatures, or the user may locate different electronic devices in the same position or different positions to generate multiple biometric signatures. Regardless of the number of biometric signatures generated during the registration phase 400, those biometric signatures can be stored in the biometric database for future use in authentication.

In the usage phase 450, the user may be prompted to locate the electronic device in one of the predetermined positions where biometric signatures were defined in the registration phase 400. Assume, for example, that the user is attempting to complete a transaction using a POS system. In such a scenario, the POS system may transmit—either directly or indirectly—a request to authenticate the user to the authentication platform. For example, the POS system may transmit a request to perform authentication directly to the electronic device across a wireless channel established in accordance with a short-range communication protocol, such as Bluetooth, Near Field Communication (NFC) Wi-Fi, etc. As another example, the POS system may transmit an indication that authentication is necessary \ to a server system across a network, and the server system may transmit a request to perform authentication to the electronic device.

After receiving the request, the authentication platform can perform the steps discussed above with respect to the registration phase 400 in order to generate a biometric signature. As noted above, those steps may need to be performed one or more times in order to generate a biometric signature of acceptable quality.

Information regarding the electronic device or user to be authenticated may be used to retrieve one or more reference biometric signatures from the biometric database. For example, criteria such as the geographical location of the electronic device, identifier of the electronic device, and alleged identity of the user may be used to identify the reference biometric signature(s). The VD authentication algorithm can then compare the biometric signature to the reference biometric signature(s). For example, the VD authentication algorithm may identify equivalent features of the biometric signature and a reference biometric signature. One example of a feature is a series of elements in both vectors for which frequency shift is increasing, indicating the beginning of a pulse beat. From the start of the equivalent feature, the value in each element of the biometric signature can be compared to the corresponding element of the reference biometric signature. This may be done to identify differences in the value and/or the rate of change of the value. This process may be repeated for one or more features determined by the VD authentication algorithm to be roughly or substantially equivalent across the biometric signature and reference biometric signature. The VD authentication algorithm can then check these differences against acceptable tolerances. For example, the VD authentication algorithm may deem the biometric signature to be sufficiently similar to the reference biometric signature if these differences fall within 0.25, 0.5, or 0.75 standard deviations.

An authentication decision may be made by the VD authentication algorithm based on, for example, the number of differences within an acceptable tolerance and/or the average size of the deviation. While the authentication platform may have varying degrees of confidence in its authentication decision as mentioned above, the authentication decision is normally binary. Said another way, the authentication decision will normally indicate either authenticated or not authenticated. The authentication decision can be communicated by the authentication platform to a destination. For example, if the request for authentication was submitted by a POS system as mentioned above, then the authentication decision can be communicated to the POS system.

FIGS. 5A-B include flow diagrams of the registration phase 500 and usage phase 550 in embodiments where the authentication platform determines whether to authenticate a user based on gesture recognition. These flow diagrams illustrate how the authentication platform may detect performances of gestures based on how those gestures alter the vascular dynamics of the user.

At a high level, the registration phase 500 and usage phase 550 of FIGS. 5A-B are comparable to the registration phase 400 and usage phase 450 of FIGS. 4A-B. Here, however, the user may be prompted to perform a gesture while the electronic device is located proximate to an anatomical region of the body. The gesture may be selected (e.g., from amongst multiple potential gestures) as performance of the gesture may cause an observable change in vascular dynamics of a blood vessel located in the anatomical region. For example, the gesture may require that the user tense a thigh muscle once per second over the course of several seconds, or the gesture may require that the user bend a wrist downward and then upward over the course of several seconds.

As discussed above, the signal emitter may emit a probing signal having characteristics defined by the VD signal characteristics algorithm into the anatomical region, and the signal sensor may sense a return signal that is representative of the probing signal as reflected by physiological structures in the anatomical region. After the return signal assessment algorithm determines that an acceptable return signal has been obtained, the gesture signature processing algorithm may process the return signal to generate a gesture signature. For example, the gesture signature processing algorithm may determine the frequency shift between the probe signal and return signal for each of N time-stamped samples taken across the measurement interval. The frequency shifts can then be normalized and stored in a vector of length N. As mentioned above, the vector may also include information such as the temporal "steps" between each frequency shift. If the user was asked to perform a known gesture, then the frequency shifts may also be associated or "tagged" with the respective actions. The vector may be representative of the gesture signature generated for the return signal.

In the registration phase 500, the gesture signature can simply be stored in the biometric database. In the usage phase 550, however, the gesture signature can be compared to at least one reference gesture signature by the gesture recognition algorithm. Criteria such as the geographical location of the electronic device, identifier of the electronic device, alleged identity of the user, and gesture may be used to identify the reference gesture signature(s). For example, the gesture recognition algorithm may identify equivalent features of the gesture signature and a reference gesture signature. One example of a feature is a series of elements in both vectors for which frequency shift is increasing, indicating the beginning of performance of a gesture.

From the start of the equivalent feature, the value in each element of the gesture signature can be compared to the corresponding element of the reference gesture signature. This may be done to identify similarities and differences in properties such as the timing, rate of change, or magnitude of the frequency shifts. Across the vectors, differences of such properties may be checked to determine whether the differences fall within a certain tolerance (e.g., within 0.5 standard deviation). Based on the differences, the gesture recognition algorithm can generate a gesture confirmation that indicates whether the gesture signature matched the reference gesture signature. In situations where the gesture confirmation indicates no match, the authentication platform may not authenticate the user, or the authentication platform may request that the user perform the gesture again (and then repeat the usage phase 550).

Figure 6A:
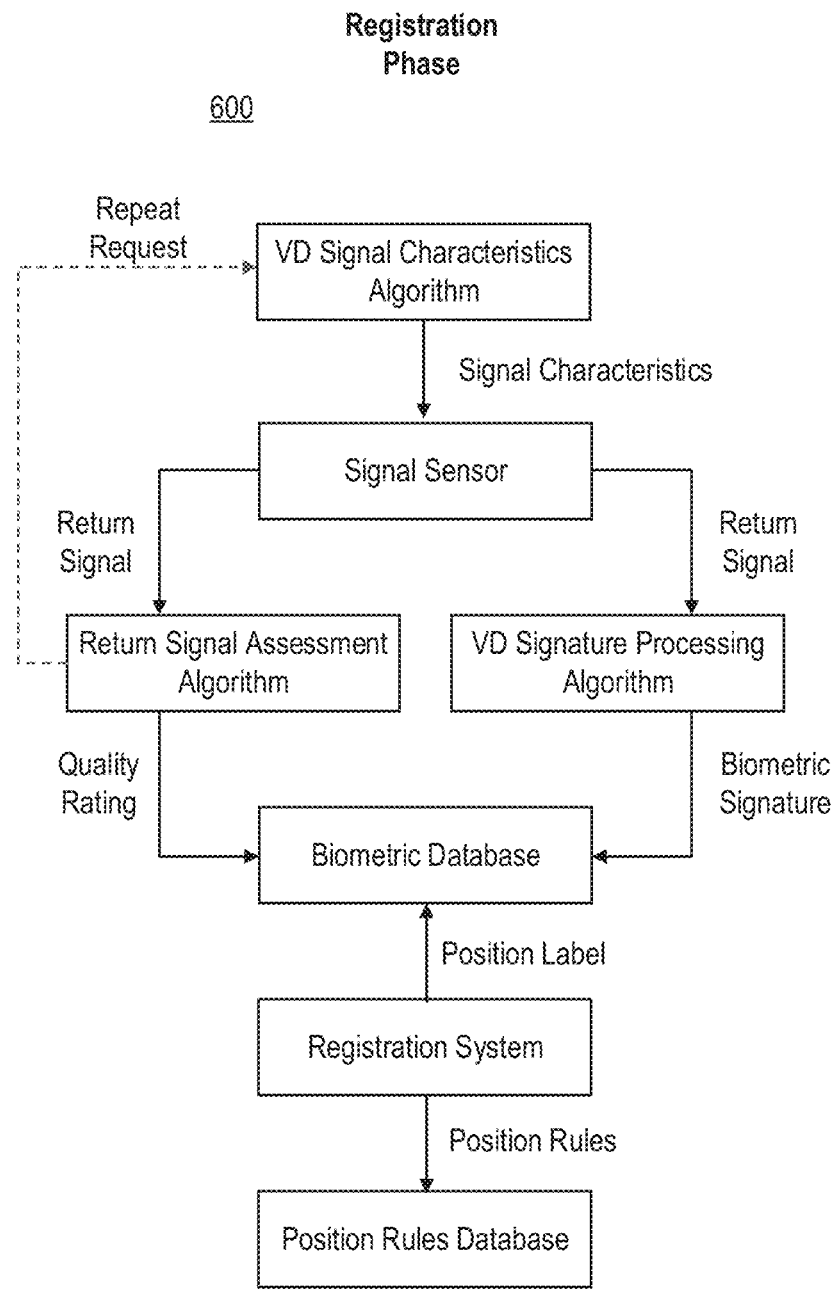
FIGS. 6A-B include flow diagrams of a registration phase and usage phase in embodiments where the authentication platform determines whether to authenticate a user based on position recognition.
Figure 6B:
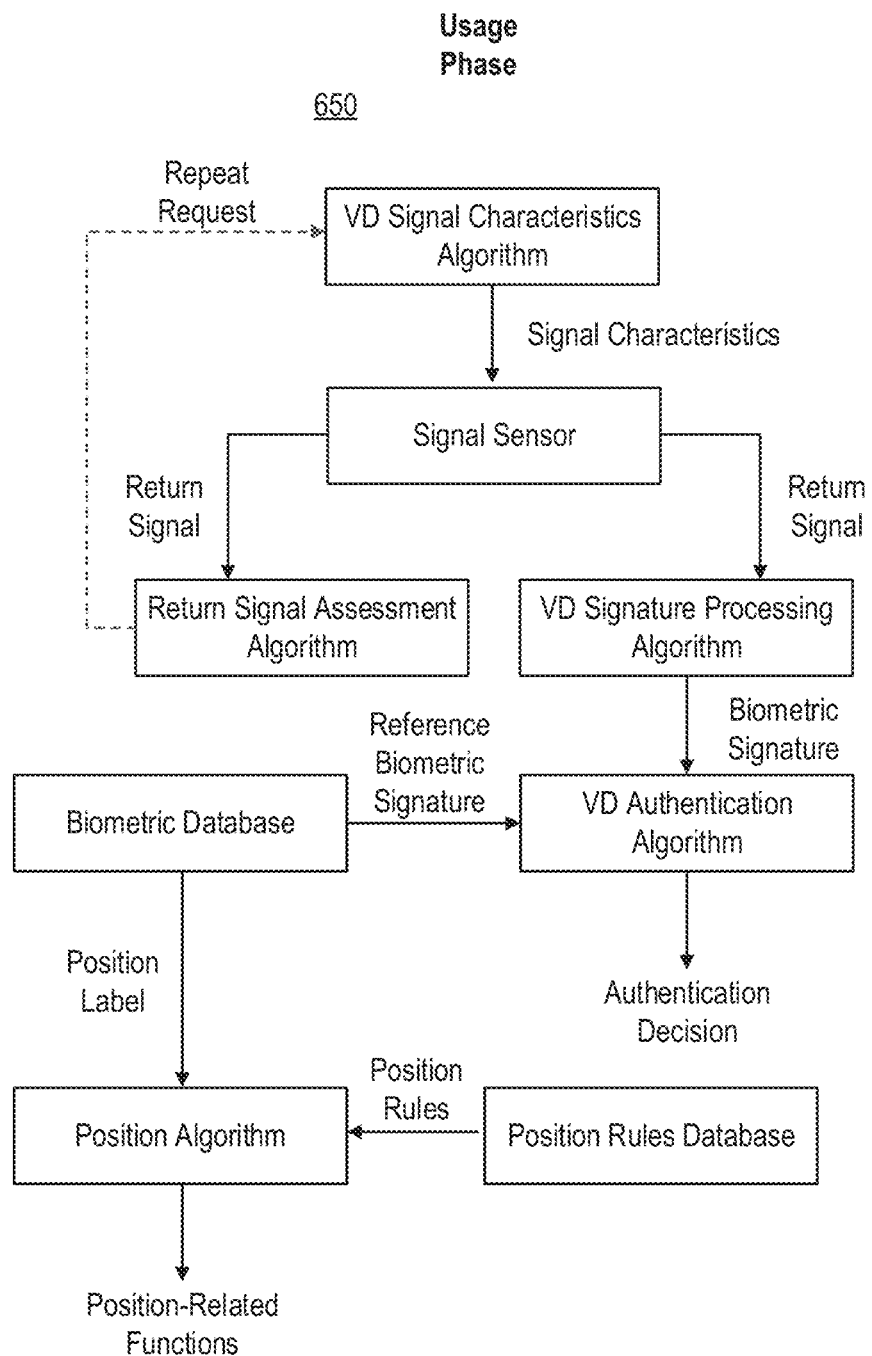

FIGS. 6A-B include flow diagrams of the registration phase 600 and usage phase 650 in embodiments where the authentication platform determines whether to authenticate a user based on position recognition. These flow diagrams illustrate how the authentication platform may assign rules, settings, or functions to locating an electronic device in a given anatomical region, by first recognizing that position from vascular dynamics and then retrieving the relevant rules from a biometric database.

As shown in FIG. 6A, the registration phase 600 may be largely similar to the registration phase 400 of FIG. 4A. After the biometric signature has been generated, however, the user may be able to assign a position label to the biometric signature. The user, authentication platform, or a separate computer program executed by the electronic device may then use the registration system to enter one or more position rules for the newly assigned position label. For example, the position algorithm may generate a table of functions within the biometric database for each position tag. These functions may be called via application programming interfaces (APIs) to apply settings to computer programs executing on the electronic device or call functions within those computer programs.

In the usage phase 650, the authentication platform may generate a biometric signature that can be compared to a reference biometric signature as discussed above with reference to FIG. 4B. After the biometric signature is generated, the position algorithm can retrieve the position label associated with the reference biometric signature from the biometric database. Then, the position algorithm can use the position label to retrieve the corresponding position rules, if any, in the position rules database. These position rules can then be used by the authentication platform (e.g., to determine whether authentication is appropriate) or another computer program executing on the electronic device. For example, in the context of a transaction completed through a computer program, the position rules may be used to determine whether the transaction meets certain criteria before authorization is granted. Additionally or alternatively, the position rules may serve or facilitate a UI. For example, a step count monitored by the electronic device may be activated by calling the relevant function via the API corresponding to a computer program associated with fitness.

Figure 7A:
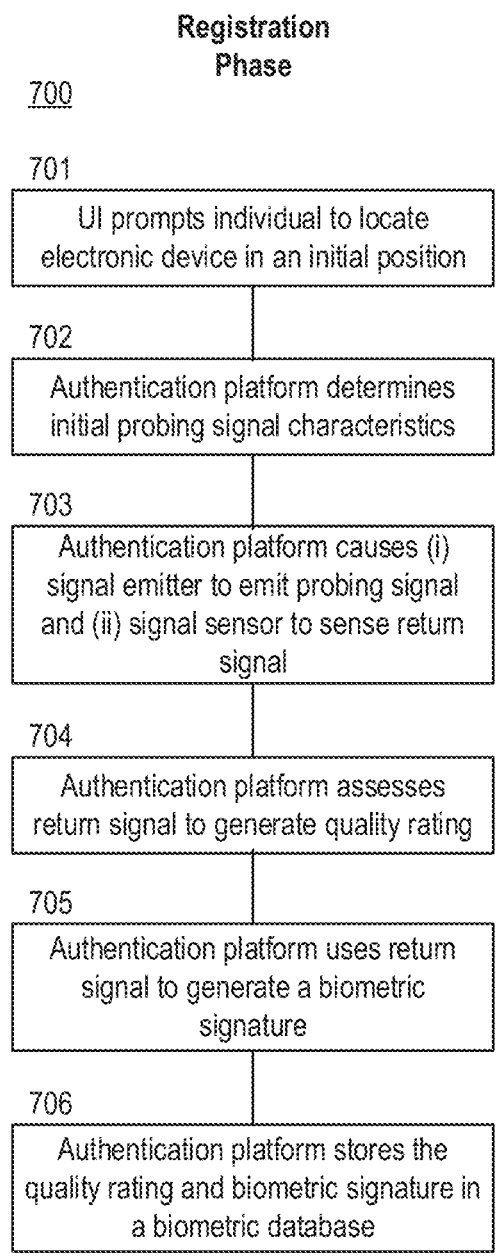
FIGS. 7A-B include flow diagrams of the registration and usage phases of one example of an authentication procedure that relies on vascular dynamics.
Figure 7B:
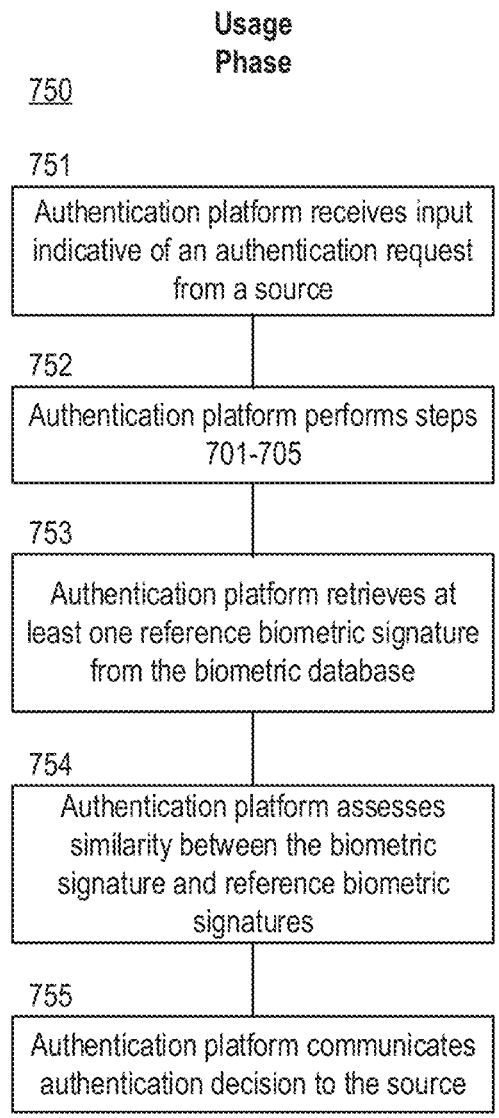

FIGS. 7A-B include flow diagrams of the registration and usage phases 700, 750 of one example of an authentication procedure that relies on vascular dynamics.

In the registration phase 700, a UI may initially prompt an individual to locate an electronic device in an initial position (step 701). Generally, the UI is be presented by the electronic device. For example, the electronic device may audibly or visually instruct the individual to locate the electronic device in the initial position. However, the UI could be presented by another electronic device. For example, the UI may be presented by a mobile phone on which the individual indicates an interest in completing the registration phase 700, though the UI may instruct the individual to locate a wearable device (e.g., a watch or fitness tracker) in a given anatomical region (e.g., the wrist).

Thereafter, the authentication platform can determine the initial characteristics of a probing signal to be emitted into the body (step 702). As mentioned above, the initial characteristics may be based on the individual, electronic device, or initial position. The authentication platform can then cause (i) a signal emitter to emit the probing signal into the body and (ii) a signal sensor to sense a return signal generated through reflection of the probing signal (step 703). For example, the authentication platform may generate an instruction that specifies the initial characteristics of the probing signal and then transmit the instruction to the operating system of the electronic device. Upon receiving the instruction, the operating system may operate a signal emitter included in the electronic device such that the probing signal having the initial characteristics is emitted. Data generated by the signal sensor that is representative of the return signal can be obtained by the authentication platform (e.g., via the operating system).

The authentication platform can assess the data (and thus the return signal) to generate a quality rating (step 703). If the quality rating falls beneath a threshold, then the authentication platform may adjust the settings of the probing signal as discussed above. However, if the quality rating exceeds the threshold, then the authentication platform can use the return signal to generate a biometric signal (step 705). Moreover, the authentication platform can store the quality rating and biometric signature in a biometric database (step 706).

In the usage phase 750, the authentication platform will initially receive input indicative of an authentication request from a source (step 751). In some embodiments, the source is a computer program that is executing on the same electronic device as the authentication platform. For example, if the authentication platform resides on a mobile phone, the authentication request may originate from a mobile application through which the user is attempting to perform an activity that requires authentication. In other embodiments, the source originates from another electronic device. Assume, for example, that the user attempts to complete a transaction using a POS system associated with a merchant. In such a scenario, the POS system may require that authentication be performed, though the scanning may be performed by an electronic device associated with the user.

Thereafter, the authentication platform can perform steps comparable to steps 701-705 of the registration phase (step 752). Accordingly, the authentication platform can generate, based on data generated by a signal sensor included in an electronic device located proximate to an anatomical region of the user, a biometric signature related to the vascular dynamics of a blood vessel in the anatomical region. Then, the authentication platform can retrieve at least one reference biometric signature from a biometric database (step 753). The reference biometric signature(s) may be associated with the individual whom the user is to be authenticated as. Accordingly, in order to determine whether to authenticate the user as the individual, the authentication platform can assess the similarity between the biometric signature and reference biometric signature(s) (step 754). Then, the authentication platform can communicate an authentication decision to the source (step 755). As discussed above, the authentication decision may be based on the degree of similarity between the biometric signature and reference biometric signature(s).

Figure 8:
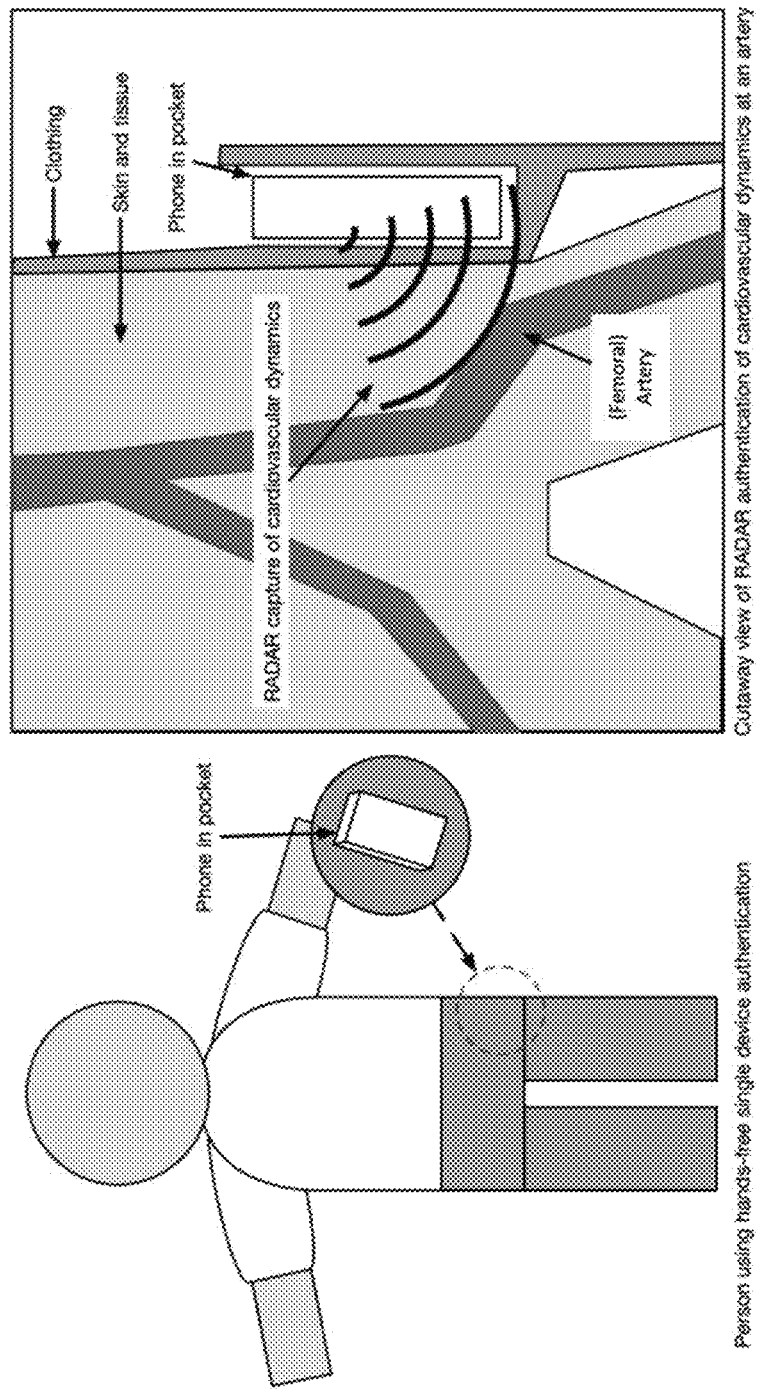
FIG. 8 includes an illustration of a scenario in which authentication of an unknown person occurs despite the unknown person leaving the electronic device in a front pants pocket.

FIG. 8 includes an illustration of a scenario in which authentication of an unknown person occurs despite the unknown person leaving the electronic device in a front pants pocket. In this embodiment, the vascular dynamics of the femoral artery are used as a means of uniquely identifying the unknown person. Those skilled in the art will recognize that, in other embodiments, authentication may be based on the vascular dynamics of another conveniently accessible blood vessel. For example, authentication may be based on the vascular dynamics of the radial artery or ulnar artery if the electronic device to be used for scanning is located proximate to the wrist or forearm. Authentication could also be based on the vascular dynamics of multiple blood vessels as mentioned above. For example, authentication may be based on the common, internal, and external iliac arteries if the electronic device to be used for scanning is located proximate to the gluteal region (e.g., in a back pants pocket).

At a high level, this approach allows for hands-free authentication as an authentication platform can define characteristics of a probing signal to be emitted into the body of the unknown person by the electronic device. The characteristics can be algorithmically generated to permit information regarding vascular dynamics to be obtained through analysis of a return signal that is representative of the probing signal as reflected by physiological structures in the body. As discussed above, the authentication platform may reside on the electronic device or another electronic device. For example, the authentication platform may reside on a network-accessible server system or POS system to which the electronic device is communicatively connected.

Normally, the probing signal is representative of electromagnetic radiation emitted within the 3.1-10.6 GHz band, though the electromagnetic radiation may be outside of that range in some embodiments. Accordingly, the probing signal may not only be able to pass through clothing before entering the body as shown in FIG. 8, but also permeate through the skin, fat, and muscle to a certain depth. The Similarly, the return signal generated through reflection of the probing signal may be able to pass through the muscle, fat, skin, and clothing to reach the electronic device. For these reasons, the unknown person may be able to simply leave the electronic device in its normal location (e.g., a front pants pocket) while authentication is performed.

There are several advantages to this approach to authentication. First, electronic devices that include signal emitters and sensors can be used without requiring conscious action to initiate or complete authentication. In fact, the approach described herein may not require that the user wear or place electronic devices in places that would disrupt normal daily usage. Second, this approach represents a new means of locating electronic devices along the surface of the body, namely, by examining the vascular dynamics of blood vessels that have been scanned. Third, while the approach may allow gestures to be performed as a means of authentication, the gestures need not be showy gestures that would draw attention. Instead, the gestures may be subtle (e.g., clenching a muscle or shifting a limb), and thus largely undetectable to others.

Figure 9:
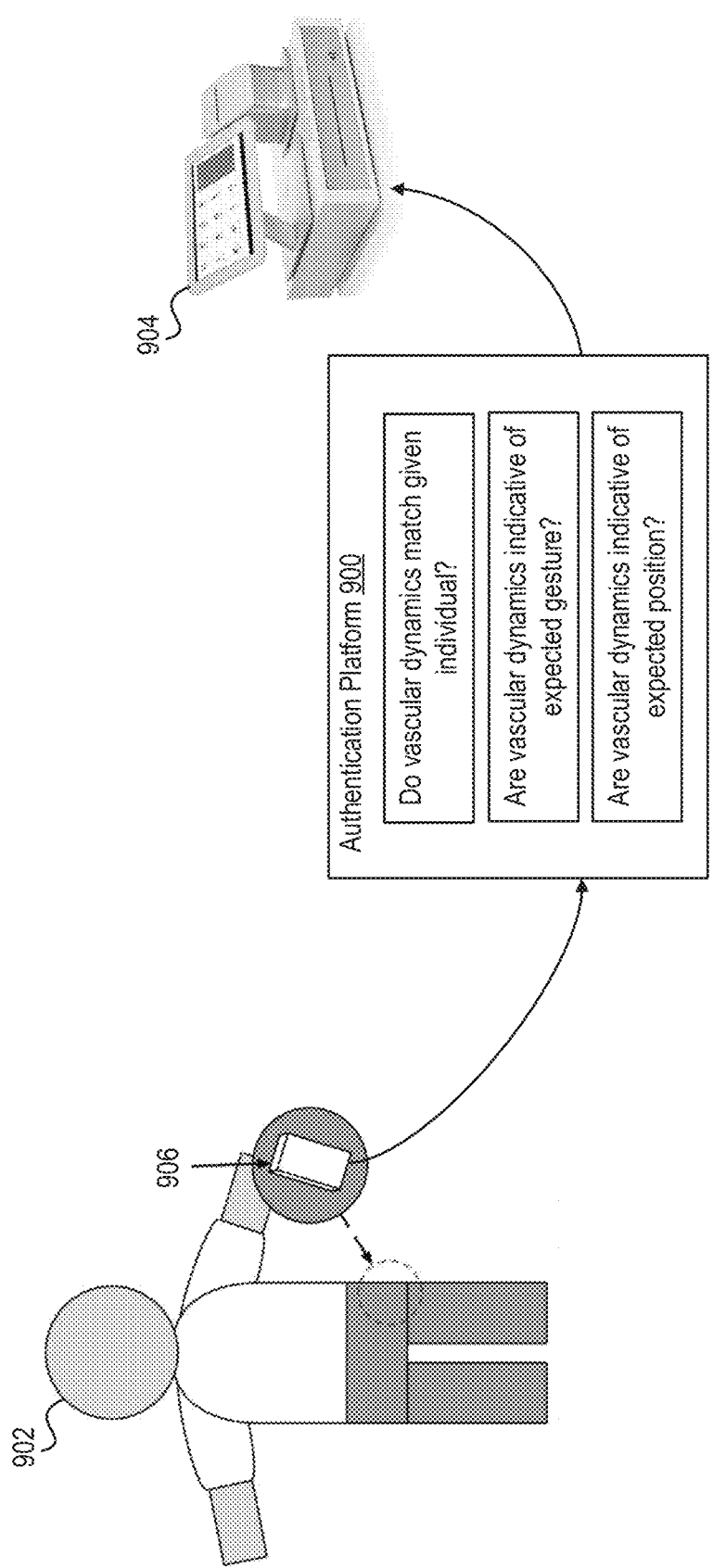
FIG. 9 illustrates one example of a schematic implementation of an authentication platform that is able to authenticate an unknown person based on the vascular dynamics of a blood vessel.

FIG. 9 illustrates one example of a schematic implementation of an authentication platform 900 that is able to authenticate an unknown person 902 based on the vascular dynamics of a blood vessel. Initially, the authentication platform 900 will obtain input indicative of a request to authenticate an unknown person (also referred to as a "user" of the authentication platform 900). In FIG. 9, the request originates from a POS system 904 that the unknown person 902 is using to complete a transaction. In other embodiments, the request could originate from elsewhere as discussed above.

Then, the authentication platform 900 can instruct the unknown person 902 to locate an electronic device 906 in a given location that corresponds to an anatomical region of interest. The instruction may be presented by the POS system 904, or the instruction may be presented by the electronic device 906. The manner in which the instruction is presented may depend on how the authentication platform 900 is deployed. Said another way, whether the instruction is presented by the POS system 904 or electronic device 906 (or some other electronic device) may depend on where the authentication platform 900 resides.

After the electronic device 906 is located in the given location, the electronic device 906 can emit a probing signal into the anatomical region of interest. Normally, the probing signal is generated in accordance with an instruction generated by the authentication platform 900. The instruction may specify characteristics of the probing signal, such as the frequency, amplitude, samples per second, emission timing, emission duration, or any combination thereof. Moreover, the electronic device 906 can generate a return signal that is representative of the probing signal as reflected by physiological structures in the anatomical region of interest.

Thereafter, the authentication platform 900 can examine the return signal to determine whether to authenticate the unknown person 902 as a given individual. In particular, the authentication platform 900 can generate a biometric signature that is indicative of the vascular dynamics of a blood vessel in the anatomical region of interest and then compare the biometric signature to at least one reference biometric signature known to be associated with the given individual. The authentication decision may be based on the degree of similarity between the biometric signature and reference biometric signature(s).

Additionally or alternatively, the authentication platform 900 could determine, based on the return signal, whether the unknown person 902 has performed an expected gesture or whether the electronic device 906 is located in an expected position. Thus, the authentication platform 900 could determine whether to authenticate the unknown person 902 based on (i) the vascular dynamics as determined from the return signal, (ii) gesture as determined from the vascular dynamics, or (iii) position as determined from the vascular dynamics.

After determining whether the unknown person 902 should be authenticated as the given individual who she claims to be, the authentication platform 900 may generate a notification that indicates the authentication decision. The notification may be transmitted to the POS system 904, which can in turn determine whether to permit the transaction based on the notification.

Figure 10:
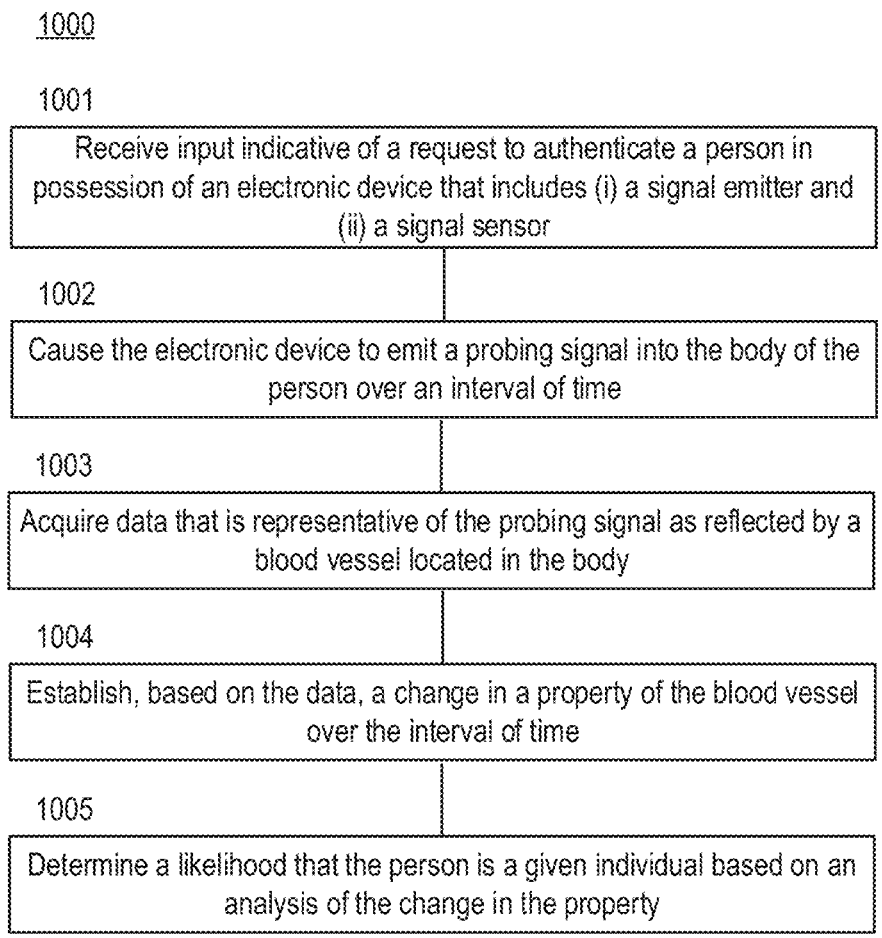
FIG. 10 depicts a flow diagram of a process for biometrically authenticating an identity of a person who claims to be a given individual.

FIG. 10 depicts a flow diagram of a process 1000 for biometrically authenticating an identity of a person who claims to be a given individual. Initially, an authentication platform can receive input indicative of a request to authenticate a person in possession of an electronic device that includes (i) a signal emitter and (ii) a signal sensor (step 1001). The signal emitter and signal sensor may be, for example, part of a UWB IC that is able to generate and detect signals within a frequency range extending over multiple GHz (e.g., 6 to 8 GHz, 6 to 8.5 GHz, 6 to 9 GHz). In some embodiments, the input is received from a computer program executing on the electronic device. In other embodiments, the input is received from another electronic device. For example, the input may be received from a POS system or network-accessible server system to which the electronic device is communicatively connected.

The authentication platform can then cause the electronic device to emit a probing signal into the body of the person over an interval of time (step 1002). For example, the authentication platform may determine appropriate characteristics of the probing signal based on the electronic device or the person, and then the authentication platform may cause the signal emitter to emit the probing signal having the appropriate characteristics. This may be accomplished by transmitting an instruction to operate the signal emitter that specifies the appropriate characteristics to the operating system of the electronic device. Thereafter, the authentication platform can acquire data that is representative of the probing signal as reflected by a blood vessel located in the body (step 1003). The data may be generated by the signal sensor included in the electronic device from which the probing signal is emitted, or the data may be based on an output produced by the signal sensor included in the electronic device from which the probing signal is emitted.

The authentication platform can establish, based on the data, a change in a property of the blood vessel over the interval of time (step 1004). Accordingly, the authentication platform may determine how the blood vessel has changed over time rather than simply observe the blood vessel in a "snapshot" corresponding to a single point in time. The property could be (i) the size of the blood vessel, (ii) the location of the blood vessel, (iii) the flow rate of blood through the blood vessel, or (iv) the pressure exerted by blood on the blood vessel.

Then, the authentication platform can determine a likelihood that the person is a given individual based on an analysis of the change in the property (step 1005). Thus, the authentication platform can determine whether to authenticate the person as the given individual based on the vascular dynamics of the user as determined from the data. For example, the authentication platform may compare the change in the property to a reference value that is included in a profile associated with the given individual and then produce a score that is indicative of the likelihood that the person is the given individual based on the similarity between the change in the property and the reference value.

In some embodiments, the authentication platform is programmed to generate a biometric signature that is representative of the change in the property as discussed above. In such embodiments, the authentication platform may examine a biometric database in which biometric signatures associated with different individuals are stored and then identify a reference biometric signature that is associated with the given individual from amongst the biometric signatures. Each biometric signature in the biometric database may be representative of a reference value for the property that has been established for the corresponding individual. The biometric database may be maintained in a datastore on the electronic device used to scan the body, or the biometric database may be maintained in a datastore that is accessible to the electronic device via a network. To establish the likelihood that the person is the given individual (and thus whether to authenticate the person), the authentication platform can compare the biometric signature to the reference biometric signature.

Other steps may also be included. As one example, the authentication platform may infer, based on the data, that the electronic device is located proximate to an anatomical region of the body. More specifically, the authentication platform may parse the data to identify a pattern of values that is indicative of a given blood vessel known to be located in the anatomical region. For instance, if the authentication platform discovers values that are representative of the vascular dynamics of the femoral artery, then the authentication platform may infer that the electronic device is located in the vicinity of the hip. As another example, the authentication platform may receive second input indicative of an acknowledgement that the person has been prompted to perform a gesture. In such embodiments, the authentication platform can determine whether the person performed the gesture based on an analysis of the data. The authentication platform may determine that the person performed the gesture responsive to discovering a pattern of values in the data that is indicative of the gesture.

FIG. 11 depicts a flow diagram of a process 1100 for generating a biometric signature for an individual that can then be used for authentication. Initially, an authentication platform can receive first input indicative of a request to create a biometric signature for an individual to be used for authentication (step 1101). The first input may not request creation of a biometric signature per se, but instead may simply be representative of a request to register the individual for an authentication service offered, facilitated, or supported by the authentication platform.

The authentication platform may then cause presentation of an instruction to locate an electronic device near an anatomical region of the body of the person (step 1102). In some embodiments the individual may need to actively position the electronic device near the anatomical region, while in other embodiments the individual may be able to leave the electronic device in its current position. For example, the electronic device may not need to be repositioned if (i) the anatomical region is the anterior or lateral region of the thigh and (ii) the electronic device is already in a front or rear pants pocket. As another example, the electronic device may not need to be repositioned if (i) the anatomical region is the anterior or posterior region of the wrist and (ii) the electronic device is already secured to the wrist. As another example, the electronic device may not need to be repositioned if the (i) the anatomical region is the thoracic region and (ii) the electronic device is already in a breast pocket. Other examples of anatomical regions include the cervical region (also referred to as the "neck region") and temporal region, and these anatomical regions could be monitored using electronic devices such as network-connected neckwear (e.g., smart necklaces), earphones, and hearing aids. Thereafter, the authentication platform can cause the electronic device to emit a probing signal into the body of the individual (step 1103) and acquire data that is representative of the probing signal as reflected by a blood vessel located in the body (step 1104). Steps 1103-1104 of FIG. 11 may be similar to steps 1002-1003 of FIG. 10.

Thereafter, the authentication platform can provide, an input, the data to an algorithm that produces a biometric signature for the individual as output (step 1105). The biometric signature may be representative of one or more values that indicate the temporal variation in a vascular property of the blood vessel. As an example, the biometric signature may comprise a vector of length N, where each element is an intensity value based on the size of the frequency shift between the probing signal and corresponding return signal. In some embodiments, the biometric signature conveys information regarding a size of the blood vessel. In other embodiments, the biometric signature conveys information regarding a depth of the blood vessel beneath the skin of the body, a flowrate of blood through the blood vessel, pressure exerted by blood on the blood pressure. In other embodiments, the biometric signature is representative of a vibrational profile of the blood vessel over the interval of time over which the probing signal is emitted into the body.

The authentication platform can then store the biometric signature in a profile associated with the individual (step 1106). The profile may be presentative of a single entry or multiple entries in a biometric database that correspond to the individual. The biometric database may be maintained on the electronic device used for scanning the body and/or another electronic device to which the electronic device is communicatively connected.

These steps may be performed in various sequences and combinations. For example, these steps may be performed a second time if the authentication platform requires that either the electronic device be relocated to another position or another electronic device be located in another position. This may be done to ensure authentication is robust to variations in the location of the electronic device. Accordingly, the authentication platform may generate biometric signatures for different anatomical regions (and thus different blood vessels), and these biometric signatures can be used—either individually or collectively—for authentication in the future.

Figure 12:
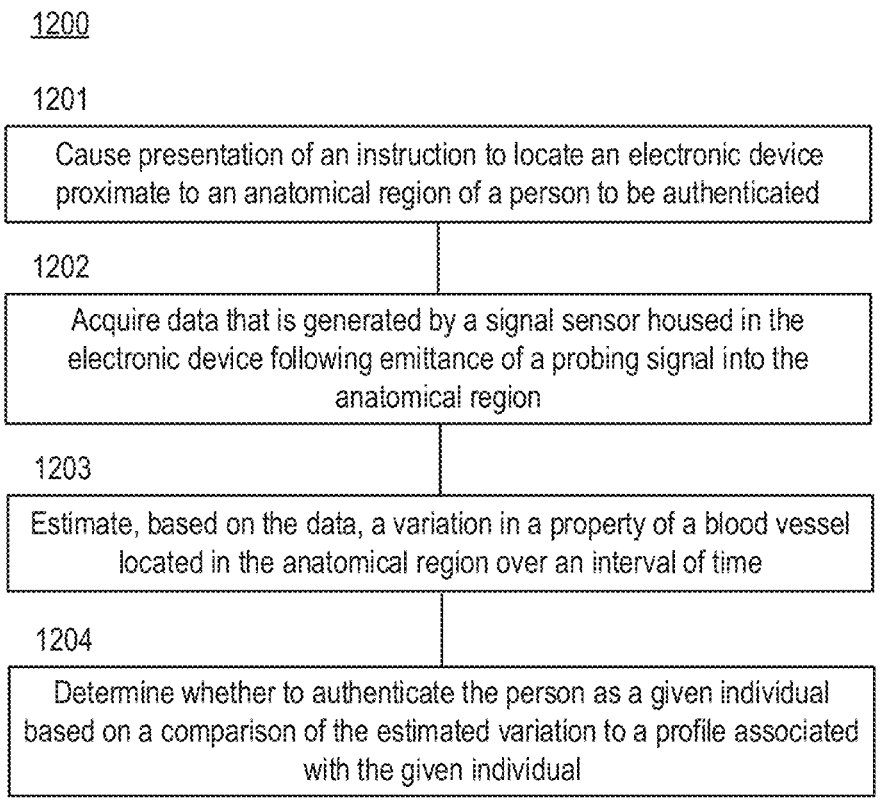
FIG. 12 depicts a flow diagram of a process for determining whether to authenticate a person as a given individual based on the vascular dynamics of a blood vessel over time.

FIG. 12 depicts a flow diagram of a process 1200 for determining whether to authenticate a person as a given individual based on the vascular dynamics of a blood vessel over time. Initially, an authentication platform can cause presentation of an instruction to locate an electronic device proximate to an anatomical region of the person to be authenticated (step 1201). The instruction may be audible or visual in nature. For example, the instruction may audibly request that the electronic device be positioned in the vicinity of the anatomical region, or the instruction may visually request (e.g., through textual instructions or a visual representation) that the electronic device be positioned in the vicinity of the anatomical region. In some embodiments the instruction is presented by the electronic device, while in other embodiments the instruction is presented by another electronic device (e.g., a POS system). Thereafter, the authentication platform can acquire data that is generated by a signal sensor housed in the electronic device (step 1202). The data may be representative of a return signal based on (e.g., generated by) reflection of a probing signal emitted into the person by the electronic device over an interval of time.

The authentication platform can estimate, based on the data, a vvariation in a property of a blood vessel located in the anatomical region over the interval of time (step 1203). The estimated variation may be representative of a change in the shape, location, flowrate, or pressure of the blood vessel over the interval of time. Then, the authentication platform can determine whether to authenticate the person as a given individual based on a comparison of the estimated variation to a profile associated with the given individual (step 1204). The profile may be representative of one or more entries in a biometric database. Each entry may include a reference value indicating how much the property varied when the given individual completed a registration phase. Accordingly, the authentication platform can compare the estimated variation to at least one reference value to determine the likelihood that the person is the given individual.

Processing System

Figure 13:
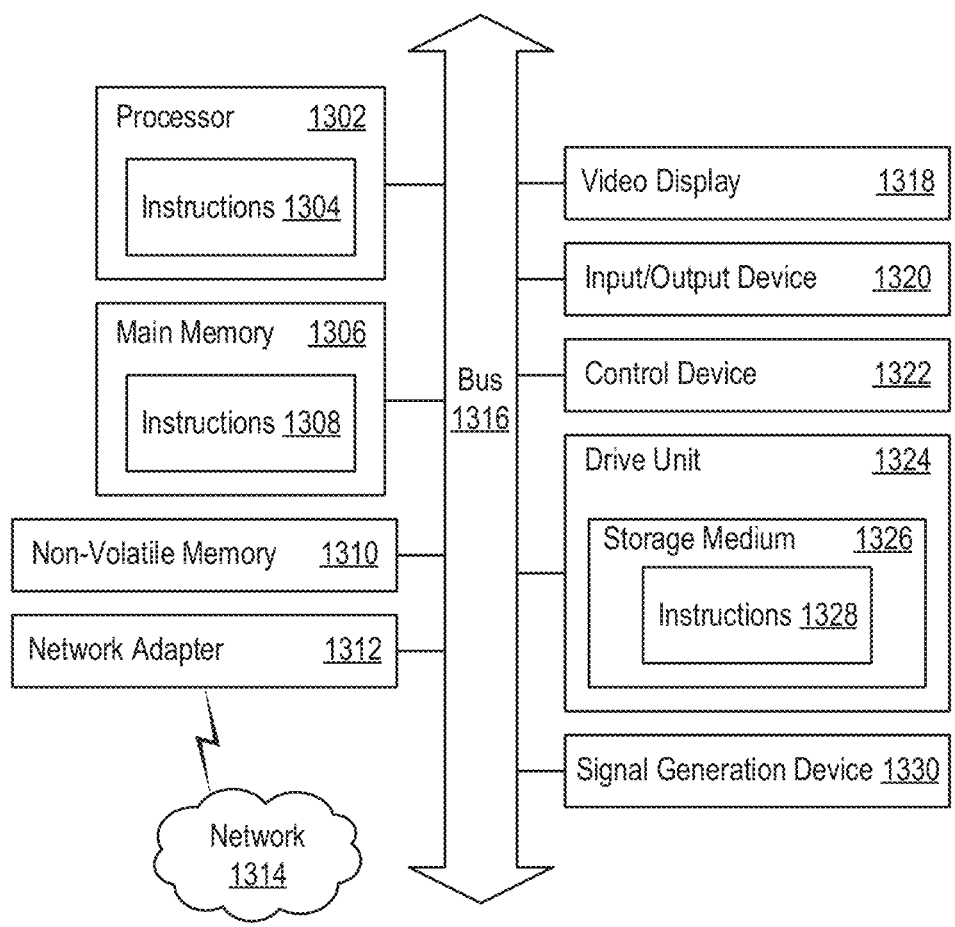
FIG. 13 is a block diagram illustrating an example of a processing system in which at least some operations described herein can be implemented.

FIG. 13 is a block diagram illustrating an example of a processing system 1300 in which at least some operations described herein can be implemented. For example, components of the processing system 1300 may be hosted on an electronic device that includes a signal emitter and signal sensor. As another example, components of the processing system 1300 may be hosted on an electronic device that includes an authentication platform.

The processing system 1300 may include a processor 1302, main memory 1306, non-volatile memory 1310, network adapter 1312 (e.g., a network interface), video display 1318, input/output device 1320, control device 1322 (e.g., a keyboard, pointing device, or mechanical input such as a button), drive unit 1324 that includes a storage medium 1326, or signal generation device 1330 that are communicatively connected to a bus 1316. The bus 1316 is illustrated as an abstraction that represents one or more physical buses and/or point-to-point connections that are connected by appropriate bridges, adapters, or controllers. The bus 1316, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or bus compliant with Institute of Electrical and Electronics Engineers (IEEE) Standard 1394.

The processing system 1300 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1300.

While the main memory 1306, non-volatile memory 1310, and storage medium 1324 are shown to be a single medium, the terms "storage medium" and "machine-readable medium" should be taken to include a single medium or multiple media that stores one or more sets of instructions 1326. The terms "storage medium" and "machine-readable medium" should also be taken to include any medium that is capable of storing, encoding, or carrying a set of instructions for execution by the processing system 1300.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memories and storage devices in a computing device. When read and executed by the processor 1302, the instructions cause the processing system 1300 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 1310, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1312 enables the processing system 1300 to mediate data in a network 1314 with an entity that is external to the processing system 1300 through any communication protocol supported by the processing system 1300 and the external entity. The network adapter 1312 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for authenticating a person as a given individual, the method comprising:
   receiving, by an electronic device, input indicative of a request to authenticate the person in possession of the electronic device;
   emitting, by the electronic device, a signal into a body of the person over an interval of time;
   acquiring, by the electronic device, data that is representative of the signal as reflected by a blood vessel located in the body;
   inferring, by the electronic device based on the data, that the electronic device is located in a pocket of an article of clothing proximate to an anatomical region of the body,
      wherein said inferring is based on a pattern of values in the data that is indicative of a given blood vessel known to be located in the anatomical region;
   establishing, by the electronic device based on the data, a change in a property of the blood vessel over the interval of time; and
   determining, by the electronic device, a likelihood that the person is the given individual based on an analysis of the change in the property.

2. The method of claim 1, further comprising:
   receiving, by the electronic device, second input indicative of an acknowledgement that the person has been prompted to perform a gesture; and
   determining, by the electronic device, whether the person performed the gesture based on an analysis of the data.

3. The method of claim 2, wherein the person is determined to have performed the gesture responsive to discovering a second pattern of values in the data that is indicative of the gesture.

4. The method of claim 1, wherein said determining comprises:
   comparing the change in the property to a reference value that is included in a profile associated with the given individual, and
   producing a score that is indicative of the likelihood that the person is the given individual based on similarity between the change in the property and the reference value.

5. The method of claim 4, wherein the property comprises (i) a size of the blood vessel, (ii) a location of the blood vessel, (iii) a flow rate of blood through the blood vessel, and/or (iv) a pressure exerted by blood on the blood vessel.

6. The method of claim 4, wherein the profile is maintained on a network-accessible server system to which the electronic device is communicatively connected.

7. The method of claim 1, wherein the data is generated by an ultra-wideband (UWB) integrated circuit in the electronic device that is able to detect signals within a frequency range extending from 6 gigahertz to 9 gigahertz.

8. The method of claim 1, wherein said determining comprises:
   examining a biometric database in which biometric signatures associated with different individuals are stored,
      wherein each biometric signature is representative of a reference value for the property that has been established for the corresponding individual,
   identifying a reference biometric signature that is associated with the given individual from amongst the biometric signatures included in the biometric database, and
   comparing the change in the property to the reference biometric signature to establish the likelihood.

9. The method of claim 8, wherein the biometric database is maintained in a datastore that is accessible to the electronic device via a network.

10. The method of claim 1, wherein the input is received from a payment system that is used by the person to initiate a transaction for which authentication is necessary.

11. The method of claim 1, wherein the anatomical region is an anterior or lateral region of a thigh, and wherein the blood vessel is a femoral artery.

12. The method of claim 1, wherein the anatomical region is a gluteal region, and wherein the blood vessel is a common iliac artery, an internal iliac artery, or an external iliac artery.

13. The method of claim 1, wherein the blood vessel and the given blood vessel are a same blood vessel.

* * * * *